US011295083B1

(12) United States Patent
Yun et al.

(10) Patent No.: US 11,295,083 B1
(45) Date of Patent: Apr. 5, 2022

(54) NEURAL MODELS FOR NAMED-ENTITY RECOGNITION

(71) Applicant: Amazon Technologies, Inc., Seattle, WA (US)

(72) Inventors: Hyokun Yun, Redmond, WA (US); Yaser Al-Onaizan, Cortlandt Manor, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/142,832

(22) Filed: Sep. 26, 2018

(51) Int. Cl.
*G06F 40/295* (2020.01)
*G06N 3/04* (2006.01)
*G06N 3/08* (2006.01)

(52) U.S. Cl.
CPC ............ *G06F 40/295* (2020.01); *G06N 3/04* (2013.01); *G06N 3/0445* (2013.01); *G06N 3/0454* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 6,018,735 A * | 1/2000 | Hunter | ............... | G06F 16/90344 |
| 6,377,637 B1 * | 4/2002 | Berdugo | ............ | G10L 19/0208 |
| | | | | 375/346 |
| 6,411,932 B1 * | 6/2002 | Molnar | .................. | G09B 19/04 |
| | | | | 704/254 |
| 7,711,546 B2 * | 5/2010 | Mola Marti | ......... | G06F 40/226 |
| | | | | 704/5 |
| 7,912,705 B2 * | 3/2011 | Wasson | ................. | G06F 40/289 |
| | | | | 704/9 |
| 8,903,717 B2 * | 12/2014 | Elliot | .................... | G06F 40/205 |
| | | | | 704/9 |
| 8,918,408 B2 * | 12/2014 | Ohtsuki | .................. | G06F 16/93 |
| | | | | 707/752 |
| 9,672,827 B1 * | 6/2017 | Jheeta | ..................... | G10L 15/32 |
| 10,163,022 B1 * | 12/2018 | Cho | ........................ | G06F 40/10 |
| 10,380,236 B1 * | 8/2019 | Ganu | .................... | G06F 40/126 |
| 2002/0022956 A1 * | 2/2002 | Ukrainczyk | ........... | G06F 40/20 |
| | | | | 704/9 |
| 2002/0165707 A1 * | 11/2002 | Call | ...................... | G06F 40/284 |
| | | | | 704/2 |
| 2005/0091081 A1 * | 4/2005 | Park | ...................... | G16H 70/00 |
| | | | | 705/2 |

(Continued)

OTHER PUBLICATIONS

Chiu et al., "Named entity recognition with bidirectional LSTM-CNNs", Transactions of the Association for Computational Linguistics, vol. 4, Jul. 19, 2016, 14 pages.

Collobert et al., "Natural language processing (almost) from scratch", Journal of Machine Learning Research, vol. 12, Aug. 2011, pp. 2493-2537.

Finkel et al., "Incorporating non-local information into information extraction systems by gibbs sampling", In Proceedings of the 43rd annual meeting on association for computational linguistics, Jun. 2005, pp. 363-370.

(Continued)

*Primary Examiner* — Thuykhanh Le
(74) *Attorney, Agent, or Firm* — Nicholson De Vos Webster & Elliott LLP

(57) ABSTRACT

Techniques for named-entity recognition are described. An exemplary implementation of a method includes extracting character features for each word of the document using a first encoder; extracting word level representations of for each word position using a second encoder, the word level representations being a concatenation of spelling variants; classifying the word level representations according to a first decoder; and outputting the classifications as named-entity labels.

20 Claims, 20 Drawing Sheets

(56) References Cited

U.S. PATENT DOCUMENTS

| | | | | |
|---|---|---|---|---|
| 2006/0074626 | A1* | 4/2006 | Biswas | G06F 30/367 704/8 |
| 2006/0190263 | A1* | 8/2006 | Finke | G10L 15/1822 704/270 |
| 2007/0124146 | A1* | 5/2007 | Lunteren | H04L 63/145 704/255 |
| 2007/0233656 | A1* | 10/2007 | Bunescu | G06F 40/295 |
| 2009/0164431 | A1* | 6/2009 | Zivkovic | G06Q 10/10 |
| 2010/0004925 | A1* | 1/2010 | Ah-Pine | G06F 40/295 704/9 |
| 2011/0047457 | A1* | 2/2011 | Flint | G06F 40/16 715/261 |
| 2011/0145218 | A1* | 6/2011 | Meyerzon | G06F 16/9535 707/709 |
| 2012/0185480 | A1* | 7/2012 | Ni | G06F 16/355 707/737 |
| 2012/0197899 | A1* | 8/2012 | Li | H04W 4/14 707/741 |
| 2012/0290288 | A1* | 11/2012 | Ait-Mokhtar | G06F 40/211 704/9 |
| 2013/0007061 | A1* | 1/2013 | Luomala | G06F 16/144 707/776 |
| 2013/0007749 | A1* | 1/2013 | Chi | G06Q 10/06 718/100 |
| 2013/0046995 | A1* | 2/2013 | Movshovitz | H04L 9/0618 713/189 |
| 2013/0142266 | A1* | 6/2013 | Strom | H03M 7/30 375/240.16 |
| 2013/0151238 | A1* | 6/2013 | Beaurpere | G06F 40/242 704/9 |
| 2013/0158983 | A1* | 6/2013 | Jakubik | G06F 40/211 704/9 |
| 2014/0189662 | A1* | 7/2014 | Mameri | G06F 8/40 717/140 |
| 2014/0214405 | A1* | 7/2014 | Ouyang | G06F 3/0237 704/9 |
| 2014/0229159 | A1* | 8/2014 | Branton | G06F 16/345 704/9 |
| 2014/0278371 | A1* | 9/2014 | Elliot | G06F 40/205 704/9 |
| 2015/0112753 | A1* | 4/2015 | Suvarna | G06Q 30/0201 705/7.29 |
| 2017/0197152 | A1* | 7/2017 | Bojja | G06F 40/216 |
| 2018/0300608 | A1* | 10/2018 | Sevrens | G06N 3/0445 |
| 2018/0373947 | A1* | 12/2018 | Cho | G06N 20/00 |
| 2019/0065460 | A1* | 2/2019 | Xin | G06N 7/005 |
| 2019/0188279 | A1* | 6/2019 | Christiansen | G06F 16/156 |
| 2019/0213601 | A1* | 7/2019 | Hackman | G06N 3/084 |
| 2020/0151591 | A1* | 5/2020 | Li | G06N 20/00 |
| 2020/0302118 | A1* | 9/2020 | Cheng | G06N 3/084 |

OTHER PUBLICATIONS

Harris, Zellig S., "Distributional structure", Word, vol. 10, 1954, No. 2-3, Published online on Dec. 4, 2015, pp. 146-162.

Huang et al., "Bidirectional LSTM-CRF models for sequence tagging", arXiv, Computation and Language, Aug. 2015, 10 pages.

Kilicoglu et al., "Annotating named entities in consumer health questions", Proceedings of the Tenth International Conference on Language Resources and Evaluation (LREC'16), May 2016, 8 pages.

Krizhevsky et al., "Imagenet classification with deep convolutional neural networks", In Advances in neural information processing systems, vol. 25, No. 2, Jan. 2012, 9 pages.

Lample et al., "Neural architectures for named entity recognition", Proceedings of the 2016 Conference of the North American Chapter of the Association for Computational Linguistics: Human Language Technologies, Apr. 7, 2016, 11 pages.

Levy et al., "Neural word embedding as implicit matrix factorization", In Advances in neural information processing systems, Jan. 2014, 9 pages.

Mikolov et al., "Distributed representations of words and phrases and their compositionality", In Advances in neural information processing systems, Oct. 2013, 9 pages.

Mitchell, Tom M., "The need for biases in learning generalizations", Department of Computer Science, Laboratory for Computer Science Research, Rutgers University, May 1980, 4 pages.

Pennington et al., "Glove: Global vectors for word representation", Proceedings of the 2014 Conference on Empirical Methods in Natural Language Processing (EMNLP), Oct. 2014, pp. 1532-1543.

Pradhan et al., "Towards robust linguistic analysis using ontonotes", Proceedings of the Seventeenth Conference on Computational Natural Language Learning, Aug. 8-9, 2013, pp. 143-152.

Reimers et al., "Reporting score distributions makes a difference: Performance study of LSTM-networks for sequence tagging", Conference: Proceedings of the 2017 Conference on Empirical Methods in Natural Language Processing, Jul. 31, 2017, 11 pages.

Shen et al., "Deep active learning for named entity recognition", ICLR, Feb. 4, 2018, 15 pages.

Simard et al., "Best practices for convolutional neural networks applied to visual document analysis", Proceedings of the Seventh International Conference on Document Analysis and Recognition (ICDAR 2003), vol. 3, Aug. 2003, 6 pages.

Tjong Kim Sang et al., "Introduction to the coNLL-2003 shared task: Language-independent named entity recognition", In Proceedings of the seventh conference on Natural language learning at HLT-NAACL 2003, vol. 4, Jun. 2003, pp. 142-147.

Uchimoto et al., "Named entity extraction based on a maximum entropy model and transformation rules", Proceedings of the 38th Annual Meeting of the Association for Computational Linguistics, Oct. 2000, pp. 326-335.

* cited by examiner

```
CASE SENSITIVE LOOKUP
    def case_sensitive_lookup(embedding_model, word):
        ret = np.zeros(dim)
        if word in embedding_model:
            ret = embedding_model[word]
        return ret CASE INSENSITIVE LOOKUP
    insensitive_embedding_model = {}
    for word, embedding in embedding_model.items():
        if word == word.lower() or word.lower() not in insensitive_embedding_model:
            insensitive_embedding_model[word.lower()] = embedding
    def case_insensitive_lookup(insensitive_embedding_model, word):
        ret = np.zeros(dim)
        if word.lower() in insensitive_embedding_model:
            ret = insensitive_embedding_model[word.lower()]
        return ret DIVERSIFIED LOOKUP
    def diversified_lookup(embedding_model, word):
        return np.concat(case_sensitive_lookup(embedding_model, word), case_insensitive_lookup(insensitive_embedding_model,
    word), case_sensitive_lookup(embedding_model, word[0].upper() + word[1:]))
```

*FIG. 9*

| WORD | CASE SENSITIVE | CASE INSENSITIVE | CASE SENSITIVE (FIRST CHAR CAPITALIZED) |
|---|---|---|---|
| Kate | T | T | T |
| kate | F | T | T |
| thrive | T | T | F |
| Thrive | F | F | F |
| thrve | F | T | F |
| Bass | T | T | T |
| bass | T | T | T |

NEURAL MODELS FOR NAMED-ENTITY RECOGNITION

BACKGROUND

The use of hosted computing services and storage has proliferated in recent years where large-scale networks of computer systems execute a variety of applications and services. This variety of applications and services that are used for various purposes can generate large amounts of data that, in some instances, can be in the form of documents of various lengths and in various languages. In some cases, the volume of data available creates challenges for those who wish to characterize such documents to aid in processing the data contained in the document. Determining the salient features of the documents, for example, can be a challenging problem often addressed through significant compute resource usage and/or human intervention.

BRIEF DESCRIPTION OF DRAWINGS

Various embodiments in accordance with the present disclosure will be described with reference to the drawings, in which:

FIG. 9 illustrates exemplary pseudocode for various lookups.

FIG. 10 illustrates an example of a word embedding lookup successes or failures.

DETAILED DESCRIPTION

Figure 1:
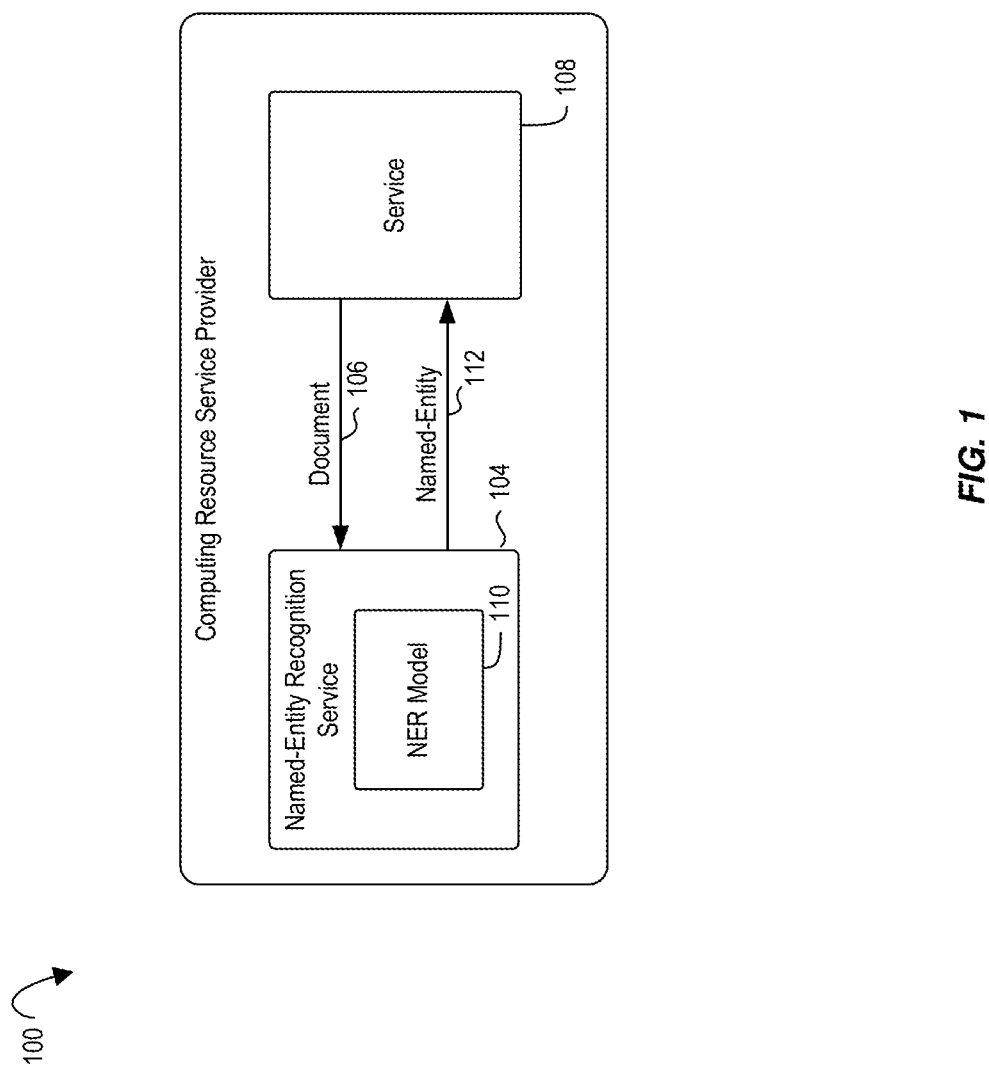
FIG. 1 illustrates embodiments of a system where entities are recognized using a named-entity recognition service.

Various embodiments of methods, apparatus, systems, and non-transitory computer-readable storage media for named entity recognition (NER) are described. According to some embodiments, a NER service performs diversified word embedding lookups and at least one of the models used for the NER was trained using augmented data.

Many named entity recognition (NER) models which achieve close to state-of-the-art performance use features that are sensitive to the capitalization of letters. This is the case for not only traditional linear models, but also recent deep-learning based models. For an example text like the following, it is clear why it is useful to take the capitalization of letters into consideration for NER:

I am Kate, and I work at Amazon Web Services.

In most standard definitions of a NER task, the correct annotation would be to identify Kate as a PERSONentity, and Amazon Web Services as an ORGANIZATIONentity. Note that in this sentence, the only words that start with an upper-case letter are I, Kate, and Amazon. Therefore, by focusing on words which start with an upper-case letter, the rest of the words am, and, work, and at are ruled out.

However, if a machine learning model for NER is trained on a dataset which is almost always correctly capitalized, as is the case for standard datasets, the model is likely to learn an inductive bias that would not generalize to incorrectly capitalized documents. For example, in an informal context, the above example sentence would appear as:

i am kate, and i work at amazon web services.

The NER model which uses capitalization-sensitive features and is trained on correctly capitalized datasets would predict that there is no entity in this sentence, because no PERSON or ORGANIZATIONentity in the dataset it was trained on would start with lower-case letters. Therefore, this type model would perform poorly on genres which incorrect capitalization of letters is very frequent, such as social text.

Detailed herein are embodiments that utilize one or more models that have been trained using augmented data and further use diversified lookups. In general, data augmentation refers to increasing the size of training data by adding transformed versions of it. Embodiments of NER herein are made more robust with respect to capitalization of letters by augmenting the training dataset with upper-cased and lower-cased versions of the training data set.

The table below shows an example of data augmentation used for training. The original dataset would only contain the sentence I work at Amazon Web Services along with named-entity annotations on it. With data augmentation, there are additional sentences for both lower cased and upper-cased versions of the sentence. Note that for both of the transformed versions, the corresponding annotation remains unchanged; amazon web services and AMAZON WEB SERVICES are still ORG entities, no matter how their letters were capitalized.

| | | | Annotation | | |
|---|---|---|---|---|---|
| | O | O | O | B-ORG | I-ORG | E-ORG |
| Original | I | work | at | Amazon | Web | Services |
| Lower-cased | i | work | at | amazon | web | services |
| Upper-cased | I | WORK | AT | AMAZON | WEB | SERVICES |

Distributed representations of words provide a compact summary of each word's usage within a corpus they are trained on in the form of a real-valued vector; these vector representations of words are called word embeddings in this discussion. A trained word embedding model provides us a key-value dictionary indicating which keys are words and which values are word embeddings of the corresponding word. Embodiments detailed herein convert each word into its word embedding vector by doing a lookup on this dictionary provided by a word embedding model, and use it as an input to the downstream machine learning model. When the word cannot be found in the dictionary, then the fall back is a default choice, which is often a vector of zeroes. In particular, lookups detailed here are "diversified." With the diversified lookup, case-sensitive and case-insensitive word embedding lookups are performed. In addition, a case-sensitive lookup with the first character of the word capitalized (kate to Kate) is performed. The results of the three different lookups are concatenated. This way, the downstream machine learning model is fully informed of distributional semantics of the word in different scenarios.

Embodiments of a named-entity recognition service analyze a sequence of words (e.g., from a document) using a stacked neural network model to perform named named-entity recognition. The named-entity recognition service identifies words from the sequence. In one embodiment, the named-entity recognition service encodes character-level features using a convolutional neural network ("CNN") model. A CNN model (also referred to as a "CNN") is a neural model that includes multiple layers and links between elements in a layer as well as links between elements in different layers. A CNN locally combines the analysis of individual characters of a word with the analysis of nearby characters in the word (e.g., the previous and next characters) to encode the character-level features of the word.

The character-level features of the word are combined with other features of the word to generate the word-level input features of the word. In one embodiment, the named-entity recognition service combines the character-level features of the word with previously generated categorizations of the word taken from at least one word corpus or dictionary. A word corpus is a structured set of text data that is used to inform statistical analysis on text data. In some embodiments, at least one word corpus or dictionary is augmented to include lower-cased and upper-cased versions of the words of the at least one word corpus or dictionary.

The words are analyzed using an encoding of the word-level features of the word (e.g., features of the word) from the word-level input features of the word using a neural model. In particular, the words are analyzed using diversified word embedding lookups. In diversified word embedding lookup there are three lookups performed and their results are concatenated. The first lookup is a case-sensitive word embedding lookup, the second lookup is a case-insensitive word embedding lookup, and the third lookup is a case-sensitive lookup with the first character of the word capitalized. In some embodiments, word-level encoding of features is performed using a CNN. The CNN combines the analysis of individual words of the document with the analysis of nearby words of the document (e.g., the previous and next words) to encode the word-level features of the word.

Finally, tags (also referred to herein as "tag labels" and "labels") are generated based on the output of the word-level encoding. In some embodiments, the tags are generated by decoding the encoded word-level features of the document using a forward LSTM (e.g., an LSTM that iterates on the words from the beginning to the end of the document) where each tag and each word is used to generate succeeding tags. In one embodiment, the first tag is a specialized tag that indicates the start of the LSTM processing. In one embodiment, the first tag is based at least in part on a particular sequencing task associated with the LSTM.

In the preceding and following description, various techniques are described. For purposes of explanation, specific configurations and details are set forth in order to provide a thorough understanding of possible ways of implementing the techniques. However, it will also be apparent that the techniques described herein may be practiced in different configurations without the specific details. Furthermore, well-known features may be omitted or simplified to avoid obscuring the techniques being described.

FIG. 1 illustrates embodiments of a system where entities are recognized using a named-entity recognition service. In the system 100 illustrated in FIG. 1, a named-entity recognition service 104 operating within an environment of a computing resource service provider 102 receives a document 106 for entity analysis. In the system 100 illustrated in FIG. 1, the document 106 is provided by a service 108 operating within the computing resource service provider 102 environment as described herein. In one embodiment, the document 106 is provided by a user or service operating outside of the computing resource service provider 102 environment. In one embodiment, the named-entity recognition service 104 receives the document 106 and uses a named-entity recognition model 110 to identify named-entity information 112 in the document 106. In the system 100 illustrated in FIG. 1, the named-entity recognition service 104 provides the named-entity information 112 to the service 108 operating within the computing resource service provider 102 environment.

In one embodiment, the computing resource service provider 102 provides access to one or more host machines hosted by the computing resource service provider 102. In one embodiment, the computing resource service provider 102 provides access to one or more services in an environment therein. In one embodiment, the one or more services provided by the computing resource service provider 102 are implemented as and/or utilize one or more virtual machine instances that are operating on host machines operating within the computing resource service provider 102 environment. In one embodiment, the computing resource service provider 102 provides a variety of services to users and/or customers of the computing resource service provider 102 such as the service 108. In one embodiment, the users and/or customers of the computing resource service provider 102 communicate with the computing resource service provider 102 via an interface such as a web services interface. In one embodiment, each of the services operating in an environment of the computing resource service provider 102 (e.g., the named-entity recognition service 104 and/or the service 108) has its own interface and, generally, subsets of the services can have corresponding interfaces in addition to or as an alternative to the single interface.

In one embodiment, a user interacts with services of the computing resource service provider (via appropriately configured and authenticated API requests) using a client computing device to provision and operate services that are instantiated on physical computing devices hosted and operated by the computing resource service provider 102 as described herein. These services are configured to manage resources (e.g., storage, processors, memory, network, etc.) associated with the services. These resources are used for various purposes, such as to operate as servers supporting a website, to operate business applications or, generally, to serve as computing power for the customer. Other applications of the services can support database applications, electronic commerce applications, business applications, and/or other such applications.

In one embodiment, the named-entity recognition service 104 is a service provided by the computing resource service provider 102 to analyze text (e.g., the document 106) and identify named-entity information (e.g., the named-entity information 112) of the text using the techniques described herein. In one embodiment, the named-entity recognition service 104 is a collection of computing resources that operate collectively to analyze text and identify named-entity information within the computing resource service provider 102 environment. These computing resources are configured to process requests to analyze text and identify named-entity information within the computing resource service provider 102 environment and include at least one of: computer systems (the computer systems including processors and memory), networks, storage devices, executable code, services, processes, modules, or applications. In one embodiment, the computing resources configured to analyze text and identify named-entity information within the computing resource service provider 102 environment include virtual systems that are implemented on shared hardware hosted by a computing resource service provider such as the computing resource service provider 102. In one embodiment, the named-entity recognition service 104 is implemented as a single system. In one embodiment, the named-entity recognition service 104 is implemented as a distributed system, with a plurality of instances operating collectively to analyze text and identify named-entity information within the computing resource service provider 102 environment. In one embodiment, the named-entity recognition service 104 operates using computing resources (e.g., databases and/or virtual machine instances) that enable the named-entity recognition service 104 to process requests to analyze text and identify named-entity information within the computing resource service provider 102 environment.

In one embodiment, the named-entity recognition service 104 maintains data and/or metadata such that, when a request to analyze text and identify named-entity information of a document within the computing resource service provider 102 environment is received, the data and/or metadata is located, processed, and provided (or a streaming data object is initiated) for use in processing the request. In one embodiment, the data and/or metadata maintained by the named-entity recognition service 104 is organized as data objects. In one embodiment, these data objects have arbitrary sizes. In one embodiment, these data objects have constraints on size or durability. Thus, the named-entity recognition service 104 is configured to manage numerous data objects of varying sizes. In one embodiment, the named-entity recognition service 104 stores the data objects in storage resources controlled by the named-entity recognition service 104. In one embodiment, the named-entity recognition service 104 stores the data objects using resources controlled by some other service such as a data storage service. In one embodiment, the named-entity recognition service 104 stores the data objects using a combination of storage locations. In one embodiment, the named-entity recognition service 104 operates as a key value store that associates the data objects with identifiers of the data objects that are used to retrieve or perform other operations in connection with the data objects. In one embodiment, the named-entity recognition service 104 generates metadata associated with the data objects and causes such metadata to process requests to migrate data processing systems to the computing resource service provider 102 environment.

In one embodiment, the service 108 is a service that performs a variety of functions within the computing resource service provider 102 environment. The variety of functions performed by the service 108 includes, but is not limited to, data warehousing functions or applications, data processing functions or applications, data analysis functions or applications, data storage functions or applications, data security functions or applications, and data management functions or applications. In one embodiment, the service 108 is a service that performs this variety of functions and is hosted outside of the computing resource service provider 102 environment. In one embodiment, the service 108 is hosted in an environment provided by a customer of the computing resource service provider 102. In one embodiment, the service 108 is hosted in an environment provided by a third party (e.g., neither the customer of the computing resource service provider 102 nor the computing resource service provider 102).

Figure 2:
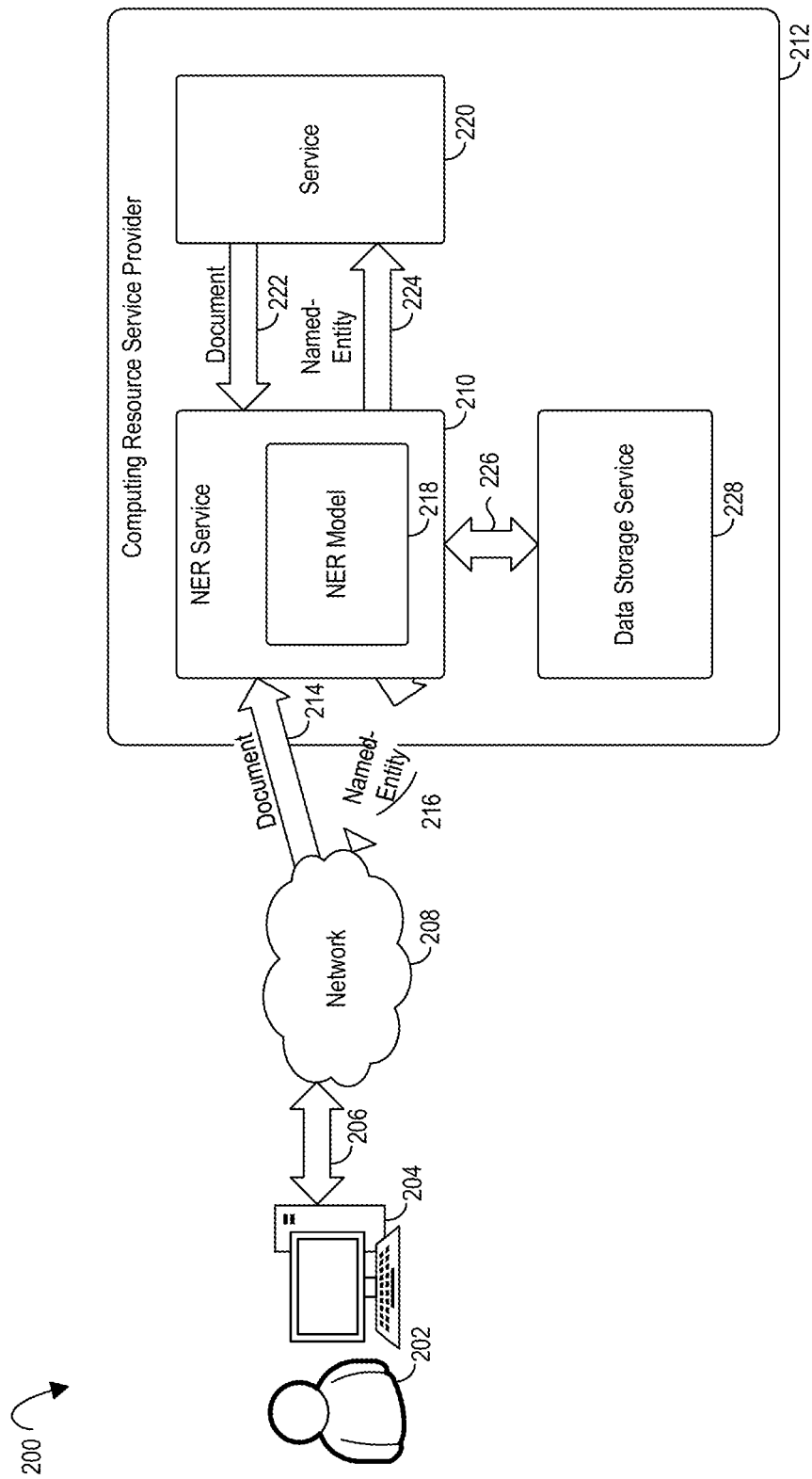
FIG. 2 illustrates embodiments of a system where named-entity information is identified and stored using a named-entity recognition service as described in connection with FIG. 1.

FIG. 2 illustrates embodiments of a system where named-entity information is identified and stored using a named-entity recognition service as described in connection with FIG. 1. In the system 200 illustrated in FIG. 2, a named-entity recognition service 210 operating within an environment of a computing resource service provider 212 receives a document 222 for NER analysis that is provided by a service 220 operating within the computing resource service provider 212 environment as described above in connection with FIG. 1. In one embodiment, the named-entity recognition service 210 receives the document 222 and uses a named-entity recognition model 218 to identify named-entity information 224 in the document 222. In the system 200 illustrated in FIG. 2, the named-entity recognition service 210 provides the named-entity information 224 to the service 220 operating within the computing resource service provider 212 environment also as described above in connection with FIG. 1.

In the example illustrated in FIG. 2, the named-entity recognition service 210 operating within the environment of a computing resource service provider 212 receives a document 214 for NER analysis that is provided by a user 202 associated with the computing resource service provider 212 using a client computing device 204 that connects 206 to the named-entity recognition service 210 of the computing resource service provider 212 via a network 208. In one embodiment, the named-entity recognition service 210 receives the document 214 and uses a named-entity recognition model 218 to identify named-entity information 216 in the document 214. In the system 200 illustrated in FIG. 2, the named-entity recognition service 210 provides the named-entity information 216 to the client computing device 204 of the user 202 using the network 208.

In the system 200 illustrated in FIG. 2, the user 202 (also referred to herein as a "customer") is a user associated with the computing resource service provider 212 that begins the process of analyzing text and identifying named-entity information of a document by issuing a command to begin the analysis of the text from the client computing device 204. In one embodiment, the command to begin the analysis of the text is generated by the user 202 of the computing resource service provider 212 who uses the client computing device 204 to connect to a variety of services provided by the computing resource service provider 212 as described herein. In one embodiment, the user 202 uses the client computing device 204 to connect to the computing resource service provider 212 over a network 208 such as those networks described herein. As described herein, a computing resource service provider 212 provides a distributed, virtualized, and/or datacenter environment within which one or more applications, processes, services, virtual machines, and/or other such computer system entities are executed. In one embodiment, the user 202 is a process running on one or more remote computer systems controlled by a customer of the computing resource service provider 212.

In one embodiment, commands to the computing resource service provider 212 to analyze text and identify named-entity information originate from an outside computer system. In one embodiment, commands to the computing resource service provider 212 originate from within the computing resource service provider 212 environment. In one embodiment, the commands to connect to the computing resource service provider 212 are sent to the computing resource service provider 212 and/or to other services operating in the environment therein, without the direct intervention of the user 202 (i.e., commands to connect to the computing resource service provider 212 are generated automatically in response to one or more events). In one embodiment, the user 202 connects to the computing resource service provider 212 environment using a privileged user account associated with the customer of the computing resource service provider 212. In one embodiment, the user 202 uses a privileged user account associated with and/or provided by the computing resource service provider 212 to connect to the computing resource service provider 212 environment.

In one embodiment, the data storage service 228 is a service provided by the computing resource service provider 212 to store data associated with analyzing text and identifying named-entity information of the text using the techniques described herein. In one embodiment, the data storage service 228 is a collection of computing resources that operate collectively to analyze text and identify named-entity information within the computing resource service provider 212 environment. These computing resources are configured to store data related to requests to analyze text and identify named-entity information within the computing resource service provider 212 environment and include at least one of: computer systems (the computer systems including processors and memory), networks, storage devices, executable code, services, processes, modules, or applications. In one embodiment, the computing resources configured to store data related to requests to analyze text and identify named-entity information within the computing resource service provider 212 environment include virtual systems that are implemented on shared hardware hosted by a computing resource service provider such as the computing resource service provider 212. In one embodiment, the data storage service 228 is implemented as a single system.

In one embodiment, the data storage service 228 is implemented as a distributed system, with a plurality of instances operating collectively to store data related to requests to analyze text and identify named-entity information within the computing resource service provider 212 environment. In one embodiment, the data storage service 228 operates using computing resources (e.g., databases and/or virtual machine instances) that enable the data storage service 228 to process requests to store data related to requests to analyze text and identify named-entity information within the computing resource service provider 212 environment. In one embodiment, the data related to requests to analyze text and identify named-entity information within the computing resource service provider 212 environment includes the requests, the text, the named-entity information, parameters used by the named-entity recognition model 218 to analyze the text, metadata associated with the request to analyze the text, or other such data.

In one embodiment, the data storage service 228 maintains data and/or metadata such that, when a request to analyze text and identify named-entity information of a document within the computing resource service provider 212 environment is received, the data and/or metadata is located, processed, and provided (or a streaming data object is initiated) for use in processing the request. In one embodiment, the data and/or metadata maintained by the data storage service 228 is organized as data objects. In one embodiment, these data objects have arbitrary sizes. In one embodiment, these data objects have constraints on size or durability. Thus, the data storage service 228 is configured to manage numerous data objects of varying sizes.

Figure 3:
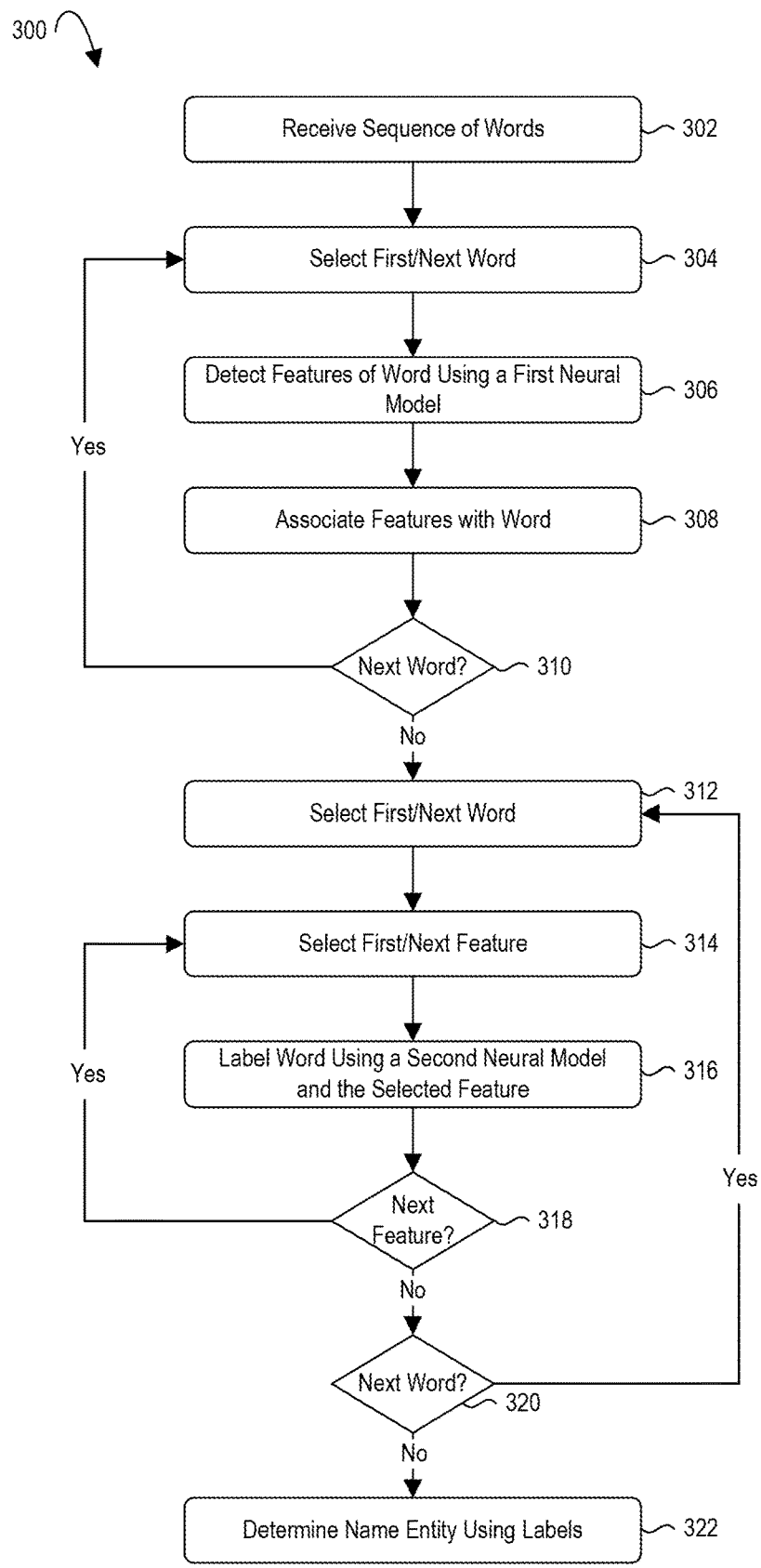
FIG. 3 illustrates embodiments of a method for identifying named-entity information using a named-entity recognition service for example as described in connection with FIG. 1.

FIG. 3 illustrates embodiments of a method for identifying named-entity information using a named-entity recognition service for example as described in connection with FIG. 1. In one embodiment, a named-entity recognition service such as the named-entity recognition service 104 described in connection with FIG. 1 performs the method 300 described in connection with FIG. 3. In one embodiment, the named-entity recognition service receives 302 a sequence of words and selects 304 the first/next word. In one embodiment, the named-entity recognition service detects 306 the features of the selected word using a first neural model. In one embodiment, the first neural model is a CNN. In one embodiment, the named-entity recognition service associates 308 the detected features with the word using diversified word embedding lookups as detailed herein. The named-entity recognition service then determines 310 if there is a next word in the sequence of words to select.

In one embodiment, if the named-entity recognition service determines 310 that there is a next word in the sequence of words to select, the named-entity recognition service selects 304 the next word and detects 306 the features of that word. In one embodiment, if the named-entity recognition service determines 310 that there is not a next word in the sequence of words to select, the named-entity recognition service starts again at the beginning of the sequence and selects 312 the first/next word. In one embodiment, the named-entity recognition service selects 314 the first/next feature of the selected word using diversified word embedding lookups and labels 316 the word to produce one or more labels of features of words using a second neural network model based at least in part on the selected feature. In one embodiment, the second neural model is an LSTM. The named-entity recognition service next determines 318 if there is a next feature to select.

In one embodiment, if the named-entity recognition service determines 318 that there is a next feature to select, the named-entity recognition service selects 314 the next feature. In one embodiment, if the named-entity recognition service determines 318 that there is not a next feature to select, the named-entity recognition service determines 320 if there is a next word to select. In one embodiment, if the named-entity recognition service determines 320 that there is a next word to select, the named-entity recognition service selects 312 the next word. In one embodiment, if the named-entity recognition service determines 320 that there is not a next word to select, the named-entity recognition service determines 322 the named-entity information for the sequence of words using the labeled words.

Figure 4:
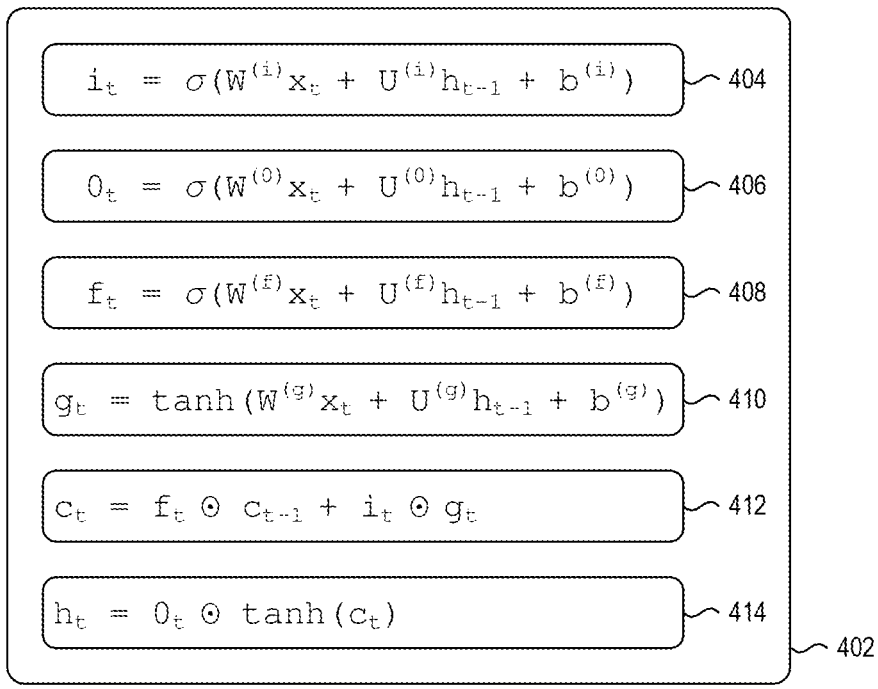
FIG. 4 illustrates a diagram representing embodiments of a long short-term memory model usable to identify name entity labels.

FIG. 4 illustrates a diagram representing embodiments of a long short-term memory model usable to identify name entity labels. The diagram 400 shows the equations 402 of a forward LSTM, which is a LSTM that processes a set of data from the start of the data to the end of the data. Given a sequence of data $x_1, x_2, \ldots, x_n$, an LSTM iteratively computes (or encodes) the hidden state $h_t$ at step t using the equations illustrated.

In the diagram 400, equation 404 is "$i_t=\sigma(W^{(i)}x_t+U^{(i)}h_{t-1}+b^{(i)})$" which computes the input gate for the LSTM that represents a parameter for the LSTM related to acquiring new information.

In the equations 402 of the forward LSTM, σ is a sigmoid activation function, tan h is a hyperbolic tangent activation function, ⊙ is an element-wise product operator, and W, U, and b are learnable parameters of the LSTM. Also, in the equations 402 of the forward LSTM, $x_t$ is the element being analyzed (e.g., the character or word) and $h_{t-1}$ is the hidden state of the previous element (e.g., the hidden state of element $x_{t-1}$). In one embodiment, the previous element is the previous letter in the word, as described herein. In one embodiment, the previous element is the previous word in the sequence of words, as described herein.

In the diagram 400, equation 406 is "$o_t=\sigma(W^{(o)}x_t+U^{(o)}h_{t-1}+b^{(o)})$" which computes the output gate for the LSTM that represents a parameter for the LSTM related to outputting new information.

In the diagram 400, equation 408 is "$f_t=\sigma(W^{(f)}x_t+U^{(f)}h_{t-1}+b^{(f)})$" which computes the forget gate for the LSTM that represents a parameter for the LSTM related to forgetting (e.g., discarding) previously acquired information.

In the diagram 400, equation 410 is "$g_t=\tan h(W^{(g)}x_t+U^{(g)}h_{t-1}+b^{(g)})$" which computes the pre-activation state for the LSTM that represents a parameter usable for computing the hidden state, described below.

In the diagram 400, equation 412 is "$c_t=f_t\odot c_{t-1}+i_t\odot g_t$" which computes the cell state for the LSTM. Equation 412 is based on the results of equation 404, equation 408, and equation 410, and is also based on the previous result of equation 412.

In the diagram 400, equation 414 is "$h_t=o_t\odot \tan h(c_t)$" which computes the hidden state for the LSTM. Equation 414 is based on the result of equation 406 and the result of equation 412. The hidden state of the LSTM is the encoded result for the LSTM for the particular data type.

As described above, the diagram 400 shows the equations 402 of a forward LSTM, which is a LSTM that processes a set of data from the start of the data to the end of the data. In various techniques described herein, both forward LSTM models and backward LSTM models (e.g., a LSTM that processes a set of data from the end of the data to the beginning of the data) are used. The equations for a backward LSTM are "$i_t=\sigma(W^{(i)}x_t+U^{(i)}h_{t+1}+b^{(i)})$" (corresponding to equation 404), "$o_t=\sigma(W^{(o)}x_t+U^{(o)}h_{t+1}+b^{(o)})$" (corresponding to equation 406), "$f_t=\sigma(W^{(f)}x_t+U^{(f)}h_{t+1}+b^{(f)})$" (corresponding to equation 408), and "$g_t=\tan h(W^{(g)}x_t+U^{(g)}h_{t+1}+b^{(g)})$" (corresponding to equation 410). Equations "$c_t=f_t\odot c_{t-1}+i_t\odot g_t$" and "$h_t=o_t\odot \tan h(c_t)$" (e.g., equation 412 and equation 414) are the same in both the forward LSTM and the backward LSTM.

Figure 5:
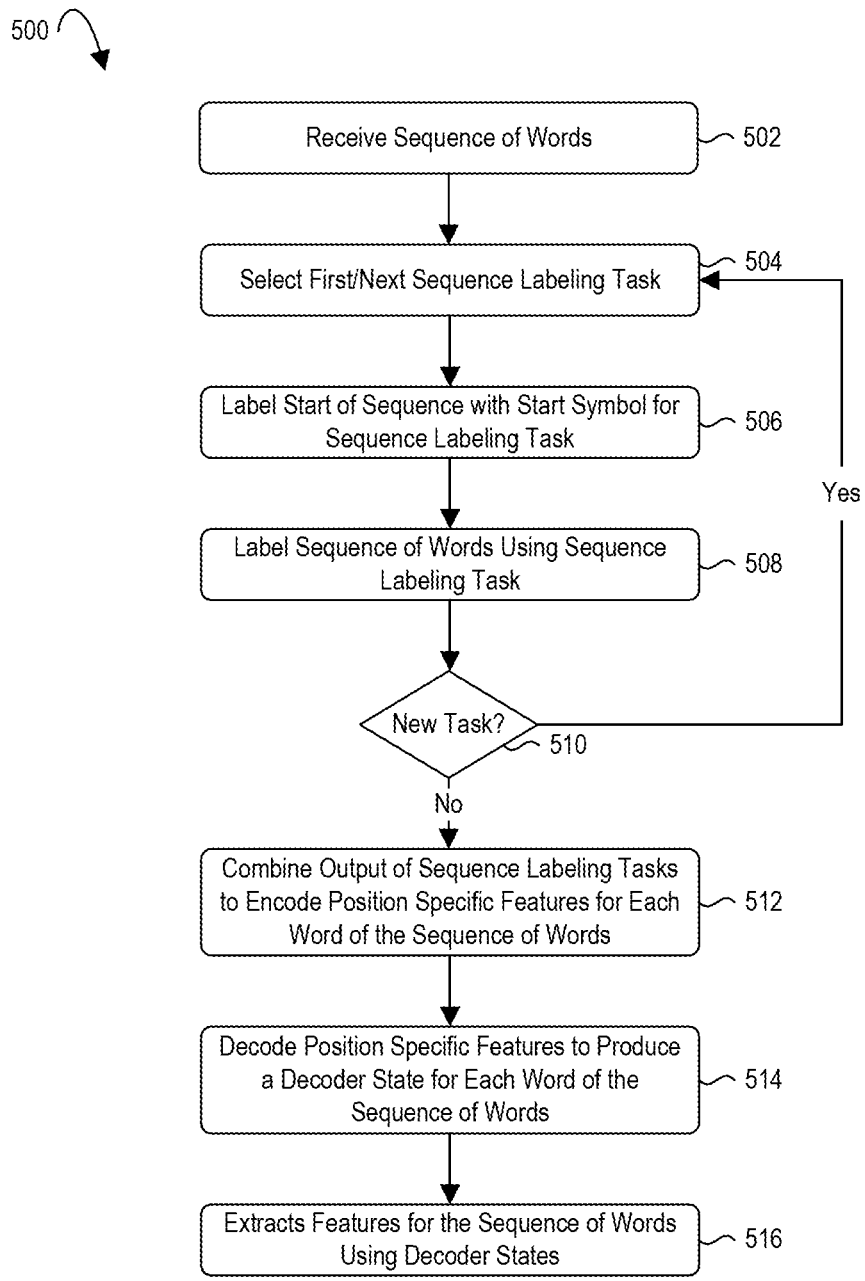
FIG. 5 illustrates a process 500 for performing multiple sequencing tasks to identify named named-entity information using a named-entity recognition service as described in connection with FIG. 1 and in accordance with embodiments.

FIG. 5 illustrates a process 500 for performing multiple sequencing tasks to identify named named-entity information using a named-entity recognition service as described in connection with FIG. 1 and in accordance with embodiments. In one embodiment, a named-entity recognition service such as the named-entity recognition service 104 described in connection with FIG. 1 performs the process 500 described in connection with FIG. 5. In one embodiment, the named-entity recognition service receives 502 a sequence of words. In one embodiment, the named-entity recognition service selects 504 the first/next sequence labeling task from one or more sequence labeling tasks. In one embodiment, the sequence labeling task is named-entity recognition.

In one embodiment, the named-entity recognition service labels 506 the start of the sequence with a start symbol associated with the sequence labeling task as described herein. In one embodiment, the named-entity recognition service labels 508 each of the words in the sequence of words according to the sequence labeling task. In one embodiment, the named-entity recognition service determines 510 if there are more sequence labeling tasks to perform. In one embodiment, if the named-entity recognition service determines 510 that there are more sequence labeling tasks to perform, the named-entity recognition service selects 504 the next sequence labeling task to perform.

In one embodiment, if the named-entity recognition service determines 510 that there are no more sequence labeling tasks to perform, the named-entity recognition service combines 512 the output of the sequence labeling tasks to encode position-specific features for each word of the sequence of words, decodes 514 the position specific features to produce a decoder state for each word of the sequence of words, and extracts 516 features for the sequence of words using the decoder states. In one embodiment, the named-entity recognition service decodes 514 the position specific features to produce a decoder state for each word of the sequence using an LSTM. In one embodiment, the named-entity recognition service decodes 514 the position specific features to produce a decoder state for each word of the sequence using a CNN. In one embodiment, the named-entity recognition service decodes 514 the position specific features to produce a decoder state for each word of the sequence using another neural model (e.g., a GRU). In one embodiment, the features are named named-entity information. In one embodiment, the named-entity recognition service extracts multiple features for each word of the sequence of words.

Figure 6:
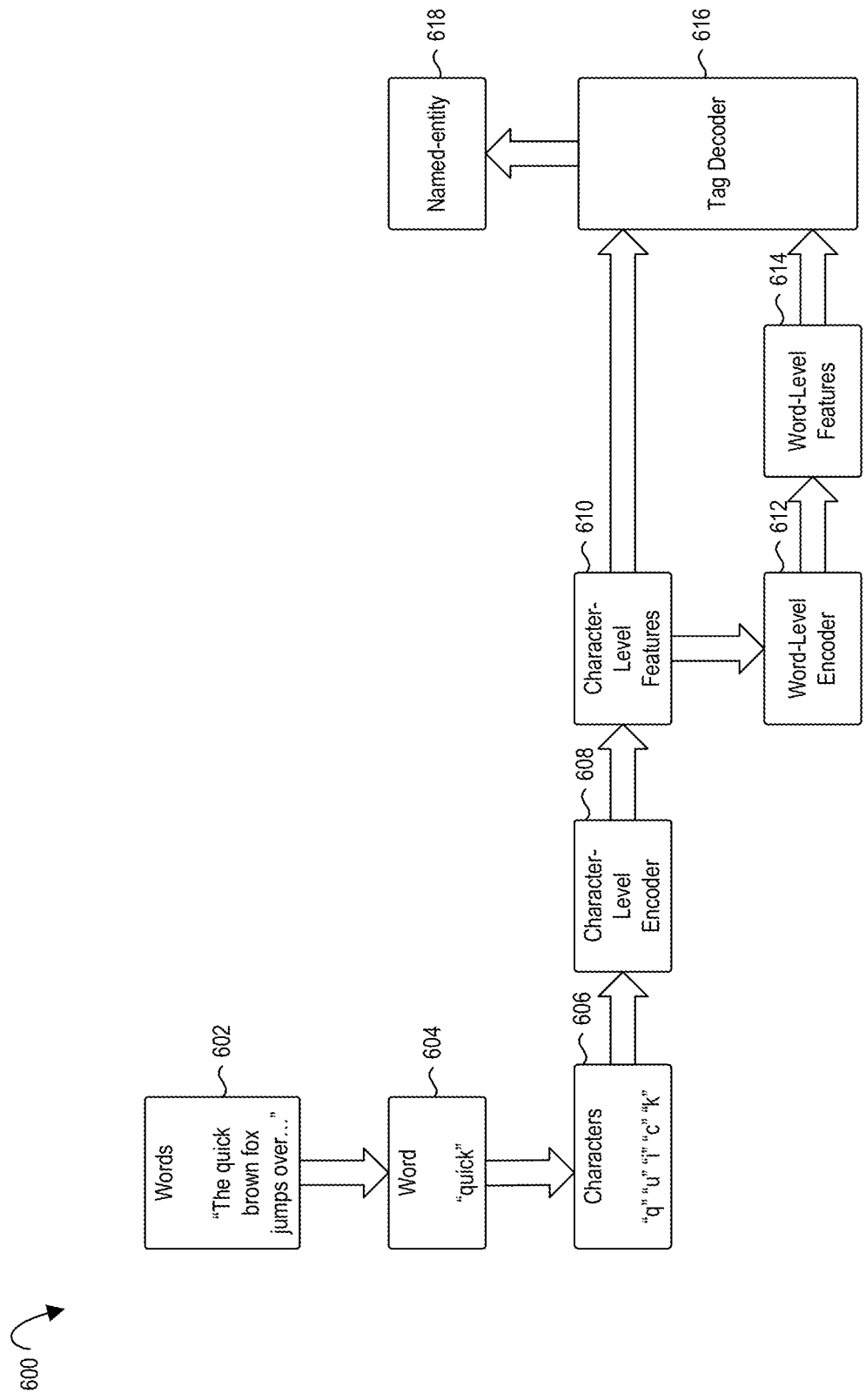
FIG. 6 illustrates embodiments of a system where a word is encoded with features and the features are decoded to produce tag labels usable to identify named-entity information using a named-entity recognition service as described in connection with FIG. 1 and in accordance with embodiments.

FIG. 6 illustrates embodiments of a system where a word is encoded with features and the features are decoded to produce tag labels usable to identify named-entity information using a named-entity recognition service as described in connection with FIG. 1 and in accordance with embodiments. In the system 600 illustrated in FIG. 6, a set of words 602 (e.g., "The quick brown fox jumps over . . . ") is provided for named-entity recognition. In one embodiment, the set of words 602 is a sequence of words with a prescribed sequential order. In one embodiment, a word 604 (e.g., "quick") of the set of words 602 is selected for analysis as part of the named-entity recognition. In one embodiment, the characters 606 (e.g., "q" "u" "i" "c" "k") of the word 604 are selected for character-level encoding as described herein.

In one embodiment, a character-level encoder 608 uses techniques described herein to extract character-level features 610 from the characters 606 of the word 604. In one embodiment, the character-level features 610 from the characters 606 of the word 604 are provided to a word-level encoder 612 that extracts the word-level features 614 of the word. In one embodiment, the word 604 is provided to the word-level encoder 612 in addition to the character-level features 610. In one embodiment, the characters 606 are provided to the word-level encoder 612 in addition to the character-level features. As noted above, the word-level encoder 612 utilizes diversified word embedding lookups and concatenates the results as the word-level features of the word.

In one embodiment, the character-level features 610 and the word-level features 614 are provided to a tag decoder 616 that generates a set of tags (also referred to herein as tag labels) for the words 602, which are used to identify the named-entity information 618 in the set of words 602 using the techniques described herein. The tag decoder 616 has been trained using data augmentation (adding upper and lower-cased versions into the training data).

Figure 7:
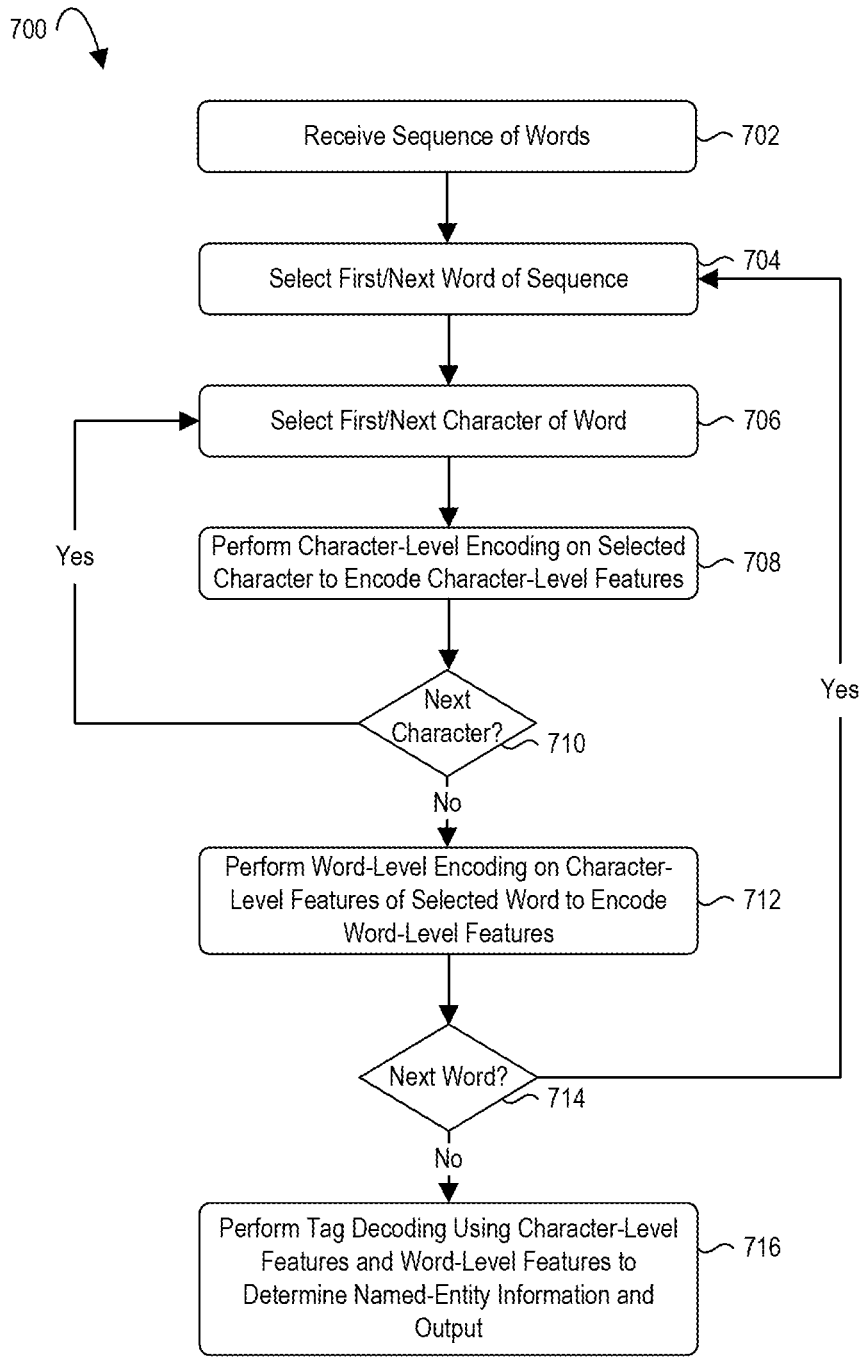
FIG. 7 illustrates embodiments of a process 700 for doing hierarchical encoding to encode a word with features that are decoded to produce tag labels usable to identify named-entity information using a named-entity recognition service as described in connection with FIG. 1 and in accordance with embodiments.

FIG. 7 illustrates embodiments of a process 700 for doing hierarchical encoding to encode a word with features that are decoded to produce tag labels usable to identify named-entity information using a named-entity recognition service as described in connection with FIG. 1 and in accordance with embodiments. In one embodiment, a named-entity recognition service such as the named-entity recognition service 104 described in connection with FIG. 1 performs the process 700 described in connection with FIG. 7. In one embodiment, the named-entity recognition service receives 702 a sequence of words. In one embodiment, the named-entity recognition service selects 704 a first/next word from the sequence of words. In one embodiment, the named-entity recognition service selects 706 the first/next character of the selected word. In one embodiment, the named-entity recognition service performs 708 character-level encoding using the selected character to encode character-level features for the selected character using techniques described herein.

In one embodiment, the named-entity recognition service determines 710 whether there are any remaining characters in the word to encode. In one embodiment, if the named-entity recognition service determines 710 that there are remaining characters in the word to encode, the named-entity recognition service selects 706 the next character of the word. In one embodiment, if the named-entity recognition service determines 710 that there are no remaining characters in the word to encode, the named-entity recognition service performs 712 word-level encoding on the character-level features of the selected word to encode word-level features for the selected word as described herein. In one embodiment, the named-entity recognition service determines 714 whether there are any remaining words to encode. If the named-entity recognition service determines 714 that there are remaining words to encode, the named-entity recognition service selects 704 the next word. In one embodiment, if the named-entity recognition service determines 714 that there are not any remaining words to encode, the named-entity recognition service performs 716 tag decoding using the character-level features and the word-level features to determine named-entity information for the sequence of words as described herein.

Figure 8:
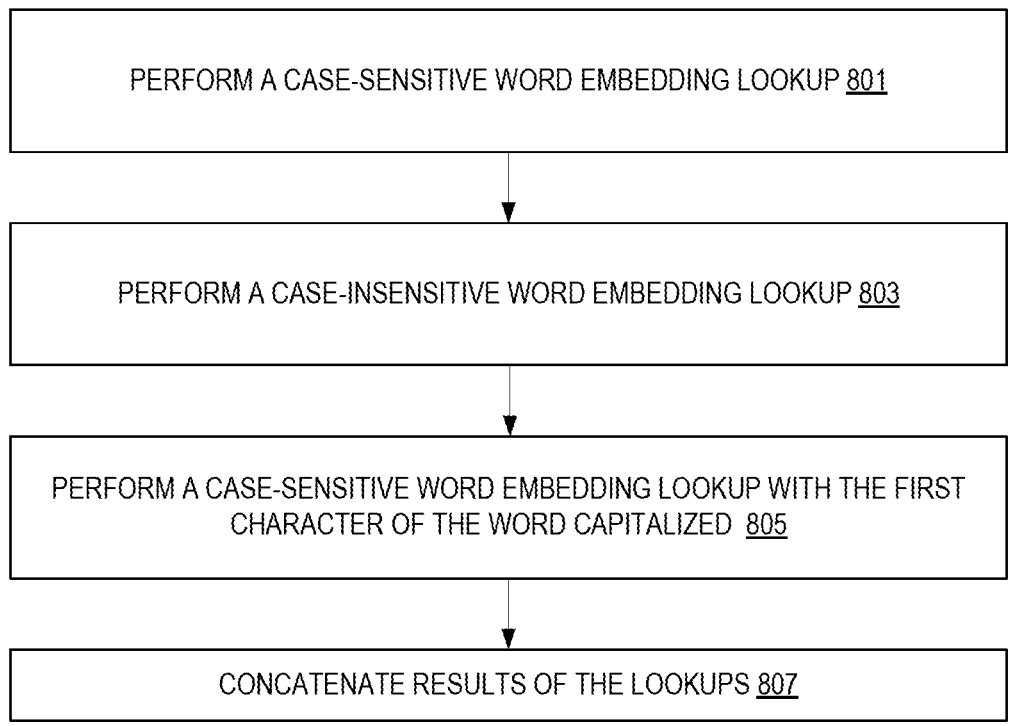
FIG. 8 illustrates embodiments of a method performed by a word-level encoder to encode word-level features using diversified lookups.

FIG. 8 illustrates embodiments of a method performed by a word-level encoder to encode word-level features using diversified lookups. For example, word level encoder 612 performs this method in some embodiments. Note the order of the lookups is not necessarily as that shown.

At 801, a case sensitive word embedding lookup is performed. In some embodiments, this lookup utilizes an embedding model that takes the word as an input and returns the word if it is found in the dictionary associated with the model and a zero when the word is not found.

At 803, a case insensitive word embedding lookup is performed. In some embodiments, this lookup utilizes an embedding model that takes the word as an input and returns the word as a lower case word if it is found as a lower case word in the dictionary associated with the model and a zero when the word is not found. In some embodiments, the case insensitive model is built by taking the words of the case sensitive model and adding lower cased versions when they are not present in the dictionary.

At 805, a case sensitive word embedding lookup is performed. In some embodiments, this lookup utilizes an embedding model that takes the word as an input and returns the word as an upper case word if it is found in the dictionary associated with the model as having only the first letter capitalized and a zero when the word is not found.

At 807, the returns of each lookup are concatenated.

FIG. 9 illustrates exemplary pseudocode for various lookups.

FIG. 10 illustrates an example of a word embedding lookup successes or failures. The numbered lines of the illustrated chart shows the word that was evaluated (including capitalization) and a result of a case sensitive lookup for the word, a case insensitive lookup for the word, and a case sensitive lookup for the word with the first character capitalized. The model was trained using augmented training data as detailed.

If a word is almost always a named entity (as in Kate), and it is correctly capitalized, then all three lookups will be successful. Line 1001 shows results of an evaluation of the word "Kate." Kate is capitalized and is a proper noun. As such, it would be found in both case sensitive lookups. It would also typically be found in a case insensitive search where the training data included both the all upper and all lower variants detailed above.

If a word is almost always a named entity, but is not correctly capitalized (as in kate), then case-sensitive lookup will fail, but case-insensitive lookup and the case-sensitive lookup with first character upper-cased will be succeed. Therefore, the downstream machine learning model will be able to guess that this is in fact an incorrect capitalization of a named entity. Line 1003 shows results of an evaluation of the word "kate." In this instance, kate is not capitalized even though it normally would as a proper noun. As such, "kate"

would not be found in a case sensitive lookup. It would, however, be found in a case sensitive lookup where the "k" was capitalized ("Kate" would be the lookup) and would be found in a case insensitive lookup.

If a word is almost always not a named entity and is correctly capitalized (as in thrive), then both case-sensitive and case-insensitive lookups will succeed, but the last lookup with first character upper-cased will fail. Therefore, the machine learning model shall recognize that this is a correct capitalization of a non-entity. Line 1005 shows results of an evaluation of the word "thrive." In this instance, thrive is not capitalized as it is normally not a proper noun. As such, "thrive" would be found in a case sensitive and case insensitive lookup. It would, however, not be found in a case sensitive lookup where the "t" was capitalized ("Thrive" would be the lookup).

If a word is almost always not a named entity but its first character was capitalized (as in Thrive), then only case-insensitive lookup will succeed.

Line 1007 shows results of an evaluation of the word "Thrive." In this instance, thrive is capitalized, but it is not normally not a proper noun. As such, "Thrive" would only be found in a case insensitive lookup.

If a word was not correctly spelled (as in thrve), then all lookups will fail. Line 1009 shows results of an evaluation of the word "thrve." In this instance, thrve is not capitalized and is a misspelled version of thrive. As such, "thrve" would not be found in any lookup.

If a word can both be a named-entity and not a named-entity (as in Bass and bass), all lookups will succeed. Lines 1011 and 1013 deal with Bass and bass which can be a proper noun (as a surname, for example) or a common noun (bass). Bass and bass would be found in all lookups as it could be a named-entity and not a named entity.

Figure 11:
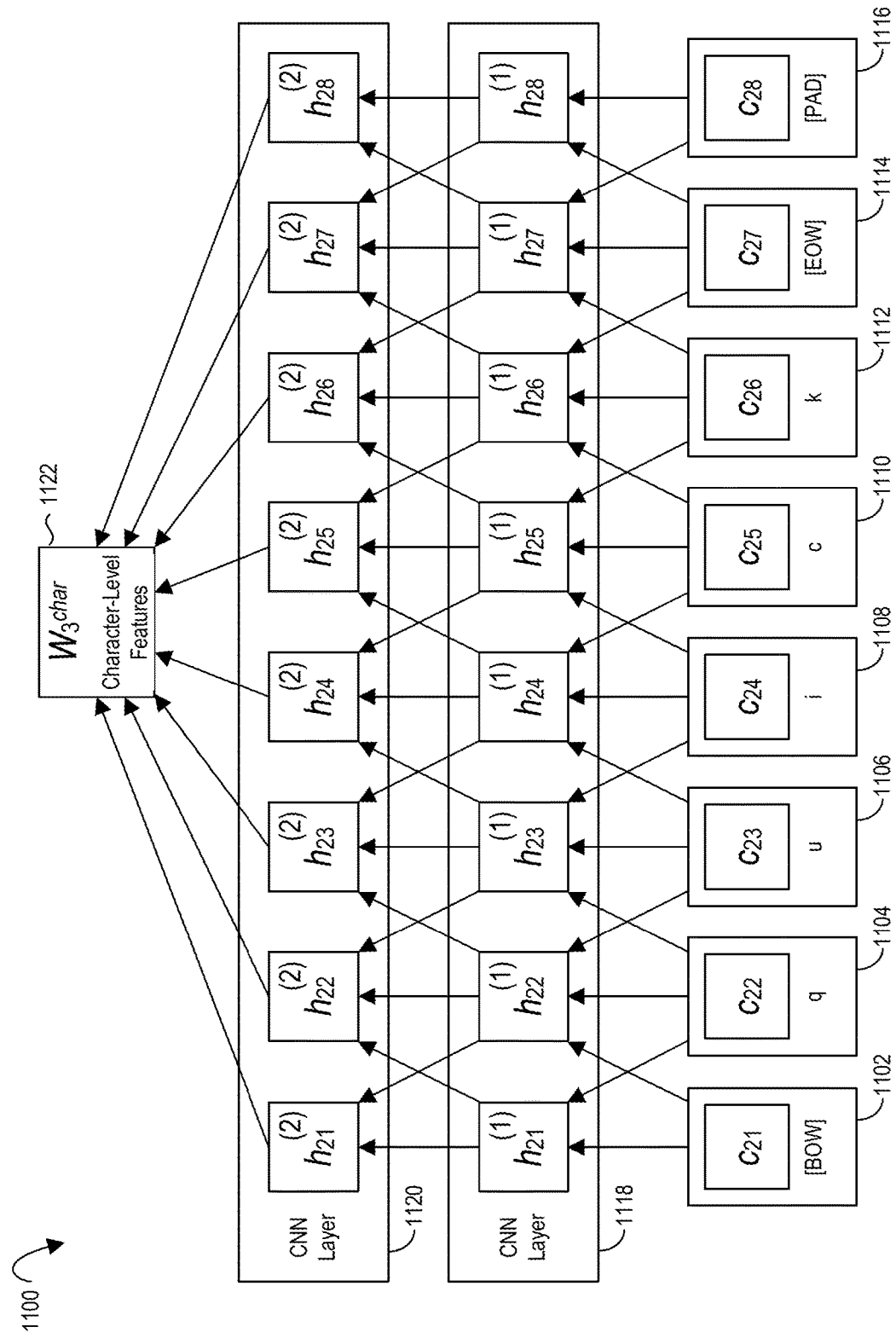
FIG. 11 illustrates embodiments of a system 1100 where character encoding is performed with a convolutional neural network model using a named-entity recognition service as described in connection with FIG. 1.

FIG. 11 illustrates embodiments of a system 1100 where character encoding is performed with a convolutional neural network model using a named-entity recognition service as described in connection with FIG. 1. In the system 1100 illustrated in FIG. 11, the CNN has two layers (e.g., CNN layer 1118 and CNN layer 1120). In one embodiment, the CNN has more than two layers. In the system 1100, the character identifiers (e.g., $c_{24}$ for letter "i" 1108) are used to identify characters and should not be confused with the cell state for the LSTM described in connection with FIG. 4.

In the system 1100, a sequence of characters representing the word "quick" are analyzed. The sequence of characters includes a beginning of word marker 1102 (e.g., "[BOW]"), the letter "q" 1104, the letter "u" 1106, the letter "i" 1108, the letter "c" 1110, the letter "k" 1112, an end of word marker 1114 (e.g., "[EOW]"), and a padding marker 1116 (e.g., "[PAD]") representing the space between "quick" and the next word (e.g., "brown").

In the system 1100, CNN layer 1118 analyzes a character and neighboring characters to encode a first set of hidden states. For example, the hidden state 14a of the CNN layer 1118 (which represents the hidden state for the CNN layer 1118 corresponding to character $c_{24}$ (e.g., the letter "i" 1108)) is determined from the character $c_{24}$ as well as from the character $c_{23}$ (e.g., the letter "u" 1106) and the character $c_{25}$ (e.g., the letter "c" 1110).

In the system 1100, CNN layer 1120 uses the first set of hidden states to encode a second set of hidden states. For example, the hidden state $h_{24}^{(2)}$ of the CNN layer 1120 (which represents the hidden state for the CNN layer 1120 corresponding to character $c_{24}$ (e.g., the letter "i" 1108)) is determined from the hidden state $h_{24}^{(1)}$ of the CNN layer 1118 as well as from the hidden state $h_{23}^{(1)}$ of the CNN layer 1118 and the hidden state $h_{25}^{(1)}$ of the CNN layer 1118. As illustrated in the system 1100, the two CNN layers (e.g., CNN layer 1118 and CNN layer 1120) encode the hidden state from a number of characters. For example, the hidden state $h_{24}^{(2)}$ of CNN layer 1120 (which represents the hidden state for the CNN layer 1120 corresponding to character $c_{24}$ (e.g., the letter "i" 1108)) is based on the characters "q" "u" "i" "c" and "k."

In one embodiment, the character-level features for the word "quick" (in this case, the third word) are concatenated 1122 together to produce $w_3^{char}$, which represents the character-level features for the third word and is a combination of the hidden states from the CNN layer 1120.

Figure 12:
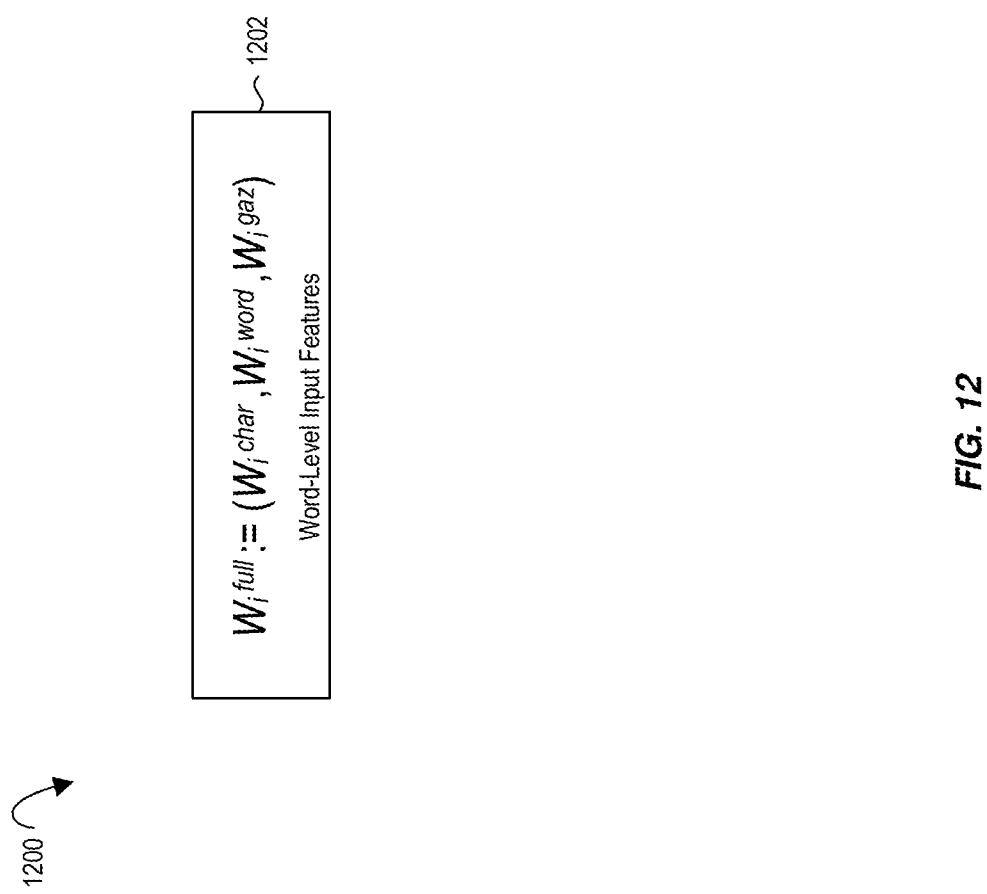
FIG. 12 illustrates an example of an equation for extracting word-level features based in part on a character encoding result usable by a named-entity recognition service as described in connection with FIG. 1 and in accordance with one embodiment.

FIG. 12 illustrates an example 1200 of an equation for extracting word-level features based in part on a character encoding result usable by a named-entity recognition service as described in connection with FIG. 1 and in accordance with one embodiment. In the example 1200, the equation 1202 ($w_i^{full} := (w_i^{char}, w_i^{word}, w_i^{gaz})$) encodes the word level input features (described below and used to encode the word-level features of a word) $w^{full}$ by combining the character-level features $w^{char}$ described above with word features from a word corpus ($w^{word}$) and/or a word gazetteer ($w^{gaz}$). In one embodiment, when a model is being constructed or trained, various dropout parameters are added to the word-level input features to change the weighting of the word-level input features, which, for some models, improves the efficacy of the training phase.

Figure 13:
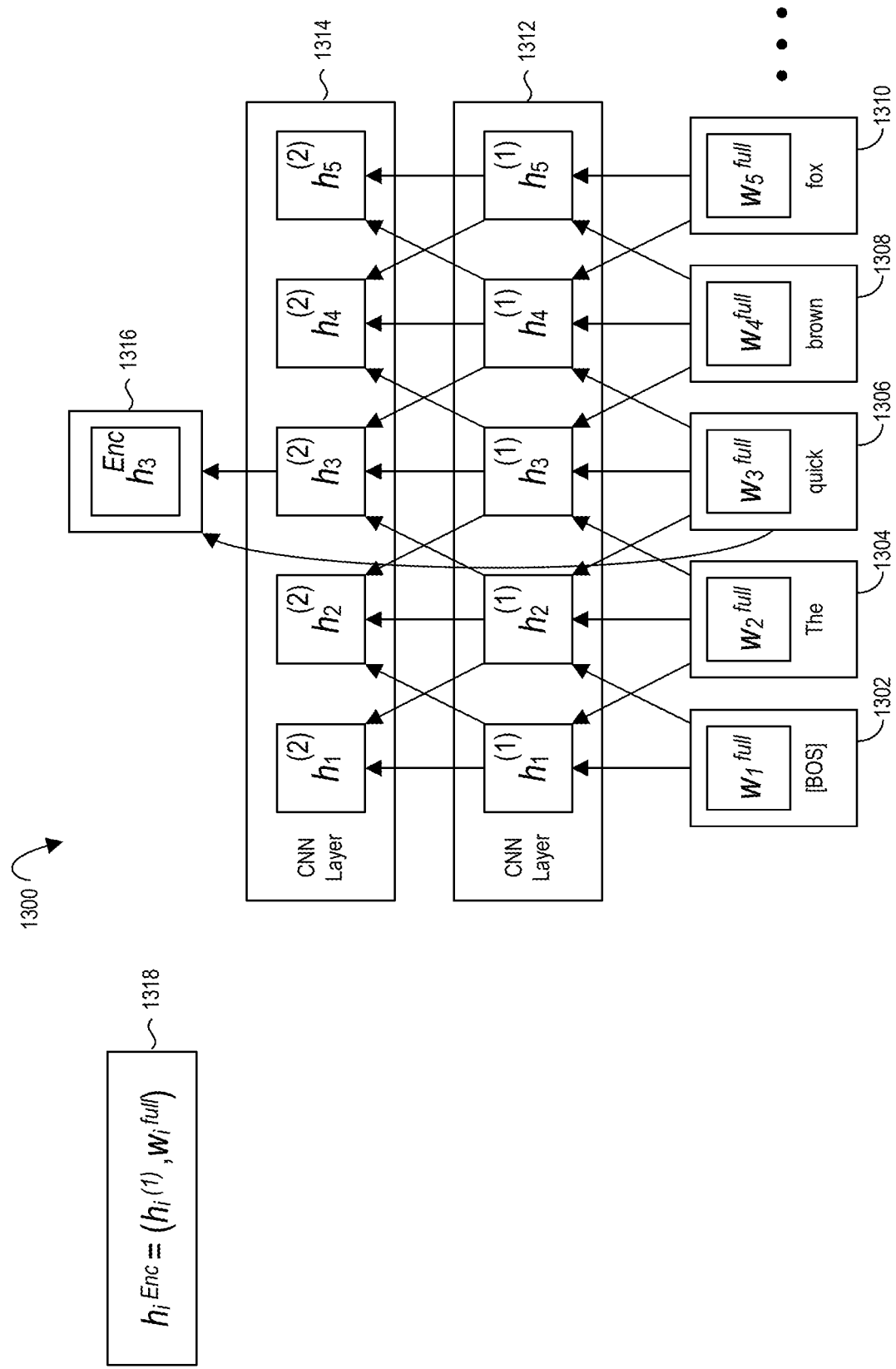
FIG. 13 illustrates embodiments of a system where a word representation is generated from extracted word-level features using a convolutional neural network model in a named-entity recognition service as described in connection with FIG. 1.

FIG. 13 illustrates embodiments of a system 1300 where a word representation is generated from extracted word-level features using a convolutional neural network model in a named-entity recognition service as described in connection with FIG. 1. In the system 1300 illustrated in FIG. 13, a sequence of words representing the sequence "The quick brown fox" is analyzed. The sequence of words includes a beginning of sequence marker 1302 (e.g., "03081"), the word "The" 1304, the word "quick" 1306, the word "brown" 1308, and the word "fox" 1310. In the example illustrated in FIG. 14, the convolutional neural network model has two layers (e.g., CNN layer 1312 and CNN layer 1314).

As with the CNN used to encode character-level features described in connection with FIG. 11, the CNN used to encode a word representation described in connection with FIG. 14 encodes a first hidden state from the words in the CNN layer 1312 and then encodes a second hidden state from the first hidden states in the CNN layer 1314. In the system 1300, the CNN layer 1312 encodes the first hidden state $h_3^{(1)}$ corresponding to the word "quick" 1306 using the full word representation $w_2^{full}$ of the word "The" 1304, the full word representation $w_3^{full}$ of the word "quick" 1306, and the full word representation $w_4^{full}$ of the word "brown" 1308. Similarly, the CNN layer 1314 encodes the second hidden state $h_3^{(2)}$ (also corresponding to the word "quick" 1306) using the hidden state $h_2^{(1)}$ from CNN layer 1312, the hidden state $h_3^{(1)}$ from CNN layer 1314, and the hidden state $h_4^{(1)}$ from CNN layer 1312.

In one embodiment, the word representation 1316 ($h_3^{Enc}$) is encoded from the hidden state $h_3^{(2)}$ from CNN layer 1314 and the word-level input features $w_3^{full}$ of the word "quick" 1306 as illustrated by the equation 1318 ($h_i^{Enc} = (h_i^{(1)}, w_i^{full})$). In one embodiment, the word representation 1316 ($h_3^{Enc}$) is encoded from the hidden state $h_3^{(2)}$ from CNN layer 1314 without the word-level input features $w_3^{full}$ of the word "quick" 1306.

Figure 14:
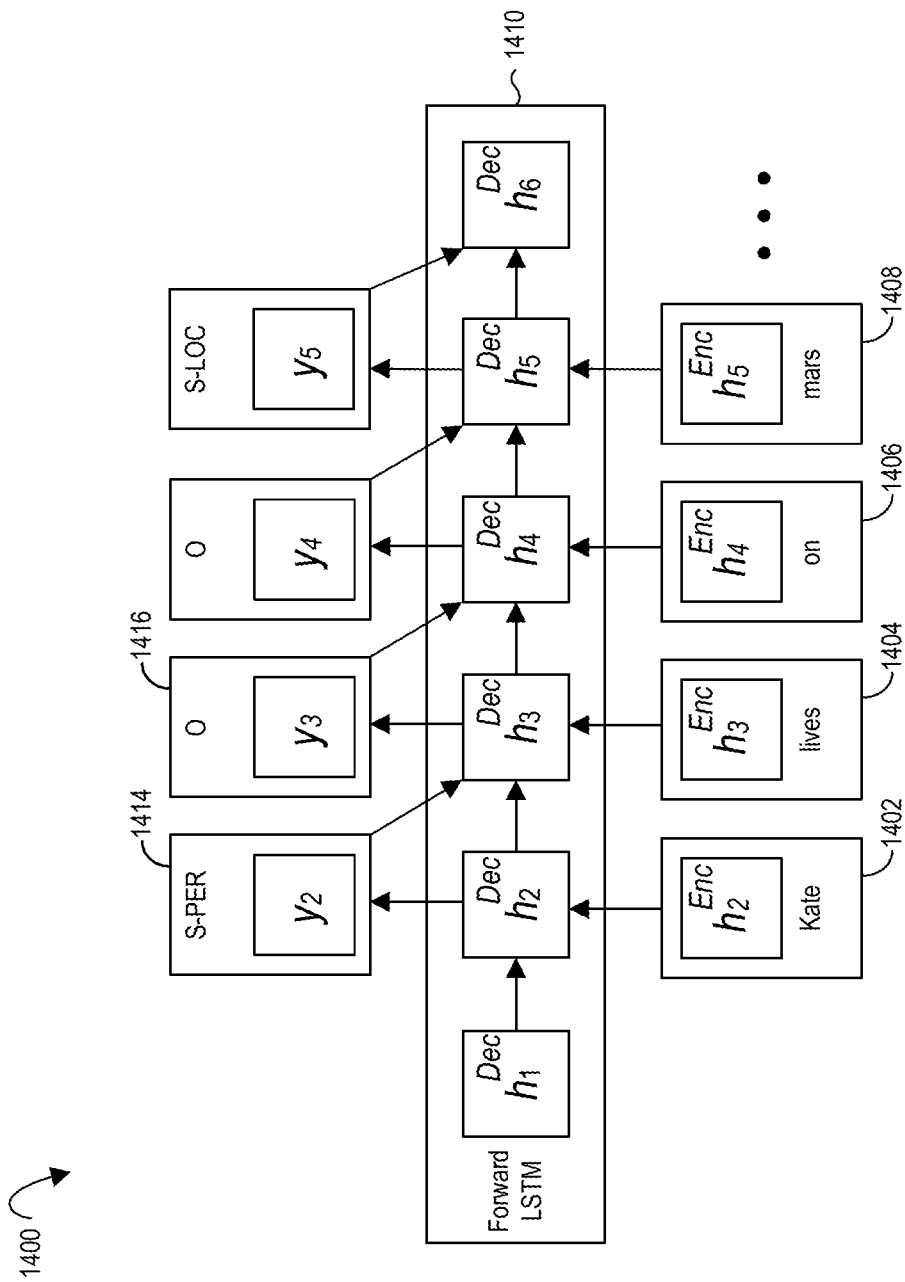
FIG. 14 illustrates embodiments of a system where tag labels are generated from word representations using a long short-term memory model in a named-entity recognition service as described in connection with FIG. 1.

FIG. 14 illustrates embodiments of a system 1400 where tag labels are generated from word representations using a long short-term memory model in a named-entity recognition service as described in connection with FIG. 1. In the system 1400 illustrated in FIG. 14, a sequence of words representing the sequence "Kate lives on mars" is analyzed. The sequence of words includes the word "Kate" 1402, the word "lives" 1404, the word "on" 1406, and the word "mars" 1408. In the system 1400 illustrated in FIG. 15, a forward LSTM 1410 decodes word representations (described above) from a previous hidden state, the encoded word representation, and a tag for the previous encoded word representation. Although not illustrated in FIG. 15, in one embodiment, the tag labels are generated from word representations using another neural model (e.g., a BiLSTM, a CNN, a GRU, or another neural model).

In the system 1400, the forward LSTM 1410 receives the word representation $h_2^{Enc}$ corresponding to the word "Kate" 1402, a previous hidden state $h_1^{Dec}$ and produces a next hidden state $h_2^{Dec}$ and a next tag 1414 (e.g., a S-PER tag). The forward LSTM 1410 continues to analyze the word sequence and next receives the word representation $h_3^{Enc}$, the hidden state $h_2^{Dec}$ (e.g., the hidden state from the previous step), the tag 1414 and produces a next hidden state $h_3^{Dec}$ and a tag 1416 ("[O]"), etc. In one embodiment, the forward LSTM 1410 continues to analyze the sequence of words until no more named-entities are found (if any).

In some embodiments, one or both of data augmentation and diversification of word embedding lookups are extended for different types of noise in text. For example, the training data can be augmented by introducing misspelled versions of it. The noise can come from statistical models of human behavior, as certain misspellings naturally occur than others. The noise model can be dependent on the language such as adding or removing accents or umlauts.

Word embedding lookups can also be diversified for different possibilities of spelling, accent, or umlaut correction, and concatenate them for the downstream machine learning model to be fully informed of these possibilities when making umlaut-insensitive lookups.

Figure 15:
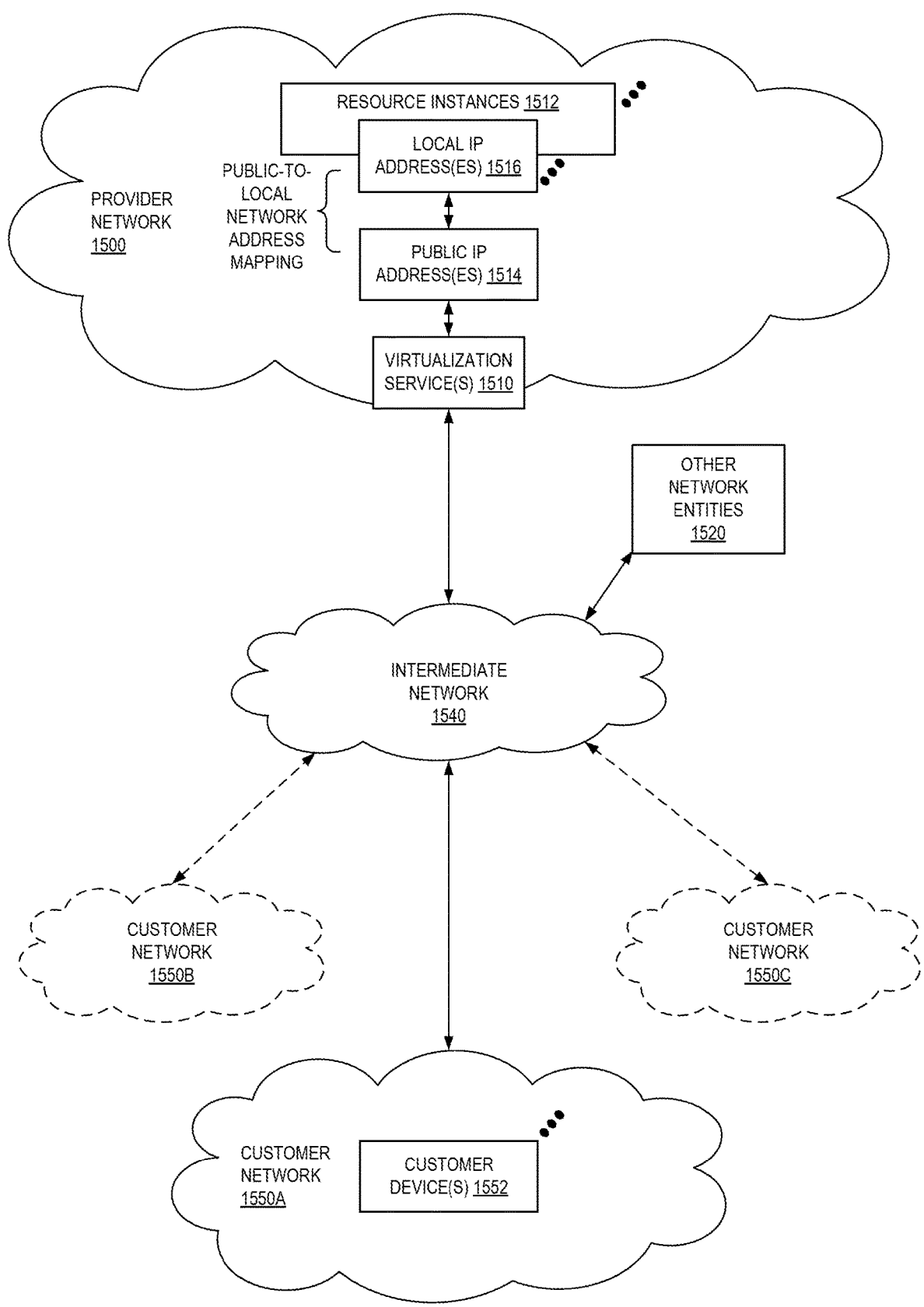
FIG. 15 illustrates an example provider network environment according to some embodiments.

FIG. 15 illustrates an example provider network (or "service provider system") environment according to some embodiments. A provider network 1500 may provide resource virtualization to customers via one or more virtualization services 1510 that allow customers to purchase, rent, or otherwise obtain instances 1512 of virtualized resources, including but not limited to computation and storage resources, implemented on devices within the provider network or networks in one or more data centers. Local Internet Protocol (IP) addresses 1516 may be associated with the resource instances 1512; the local IP addresses are the internal network addresses of the resource instances 1512 on the provider network 1500. In some embodiments, the provider network 1500 may also provide public IP addresses 1514 and/or public IP address ranges (e.g., Internet Protocol version 4 (IPv4) or Internet Protocol version 6 (IPv6) addresses) that customers may obtain from the provider 1500.

Conventionally, the provider network 1500, via the virtualization services 1510, may allow a customer of the service provider (e.g., a customer that operates one or more client networks 1550A-1550C including one or more customer device(s) 1552) to dynamically associate at least some public IP addresses 1514 assigned or allocated to the customer with particular resource instances 1512 assigned to the customer. The provider network 1500 may also allow the customer to remap a public IP address 1514, previously mapped to one virtualized computing resource instance 1512 allocated to the customer, to another virtualized computing resource instance 1512 that is also allocated to the customer.

Using the virtualized computing resource instances 1512 and public IP addresses 1514 provided by the service provider, a customer of the service provider such as the operator of customer network(s) 1550A-1550C may, for example, implement customer-specific applications and present the customer's applications on an intermediate network 1540, such as the Internet. Other network entities 1520 on the intermediate network 1540 may then generate traffic to a destination public IP address 1514 published by the customer network(s) 1550A-1550C; the traffic is routed to the service provider data center, and at the data center is routed, via a network substrate, to the local IP address 1516 of the virtualized computing resource instance 1512 currently mapped to the destination public IP address 1514. Similarly, response traffic from the virtualized computing resource instance 1512 may be routed via the network substrate back onto the intermediate network 1540 to the source entity 1520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1500; a customer may then assign their allocated public IP addresses to particular resource instances allocated to the customer. These public IP addresses may be referred to as customer public IP addresses, or simply customer IP addresses. Instead of being assigned by the provider network 1500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account.

The customer IP addresses, for example, enable a customer to engineer around problems with the customer's resource instances or software by remapping customer IP addresses to replacement resource instances.

Figure 16:
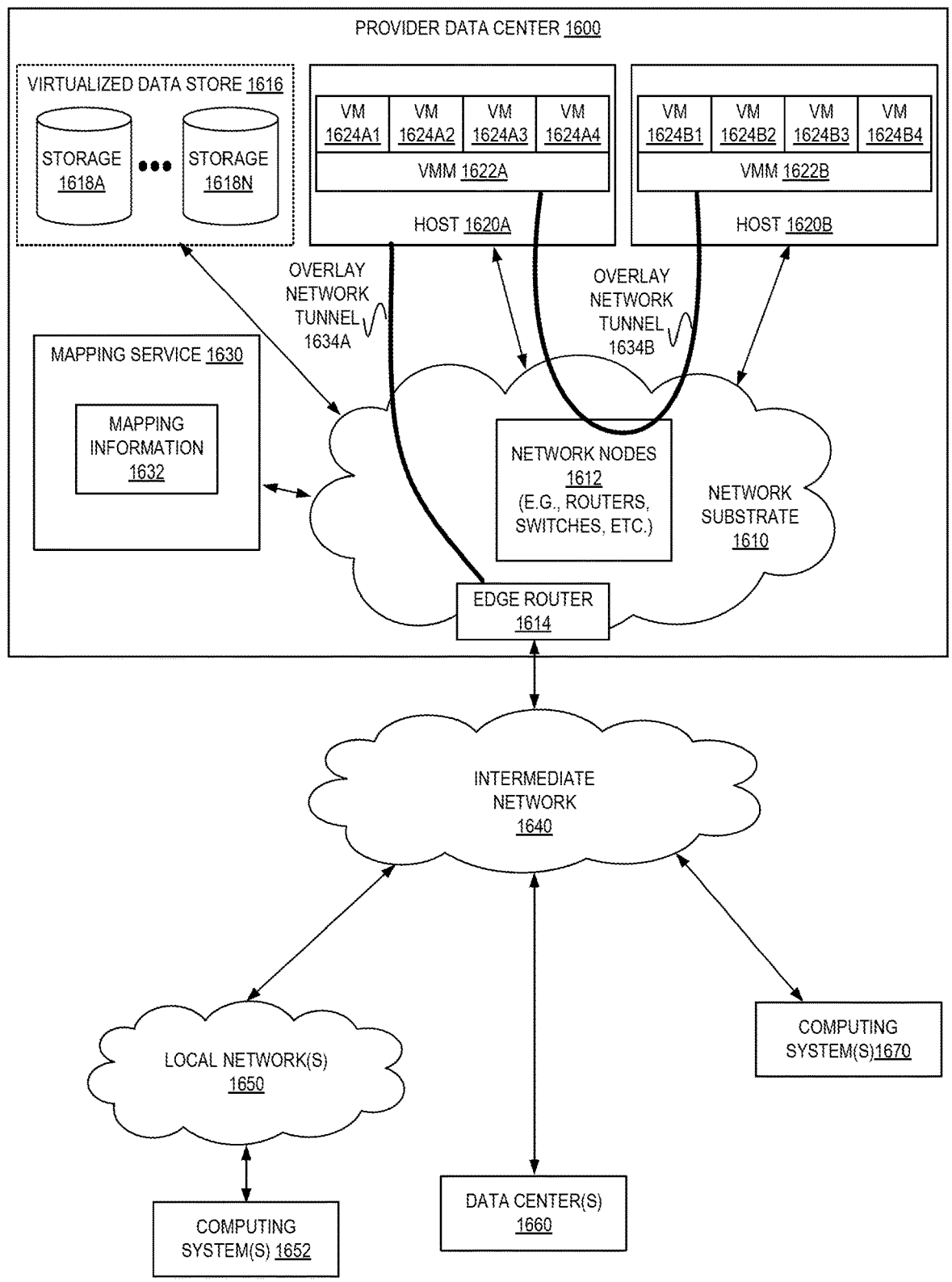
FIG. 16 illustrates an example data center that implements an overlay network on a network substrate using IP tunneling technology according to some embodiments.

FIG. 16 illustrates an example data center that implements an overlay network on a network substrate using IP tunneling technology, according to some embodiments. A provider data center 1600 may include a network substrate that includes networking nodes 1612 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1610 using tunnels. The IP tunneling technology may provide a mapping and encapsulating system for creating an overlay network on a network (e.g., a local network in data center 1600 of FIG. 16) and may provide a separate namespace for the overlay layer (the public IP addresses) and the network substrate 1610 layer (the local IP addresses). Packets in the overlay layer may be checked against a mapping directory (e.g., provided by mapping service 1630) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1630) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 16, an example overlay network tunnel 1634A from a virtual machine (VM) 1624A (of VMs 1624A1-1624A4, via VMM 1622A) on host 1620A to a device on the intermediate network 1650 and an example overlay network tunnel 1634B between a VM 1624A (of VMs 1624A1-1624A4, via VMM 1622A) on host 1620A and a VM 1624B (of VMs 1624B1-1624B4, via VMM 1622B) on host 1620B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 16, at least some networks in which embodiments may be implemented may include hardware virtualization technology that enables multiple operating systems to run concurrently on a host computer (e.g., hosts 1620A and 1620B of FIG. 16), i.e. as virtual machines (VMs) 1624 on the hosts 1620. The VMs 1624 may, for example, be executed in slots on the hosts 1620 that are rented or leased to customers of a network provider. A hypervisor, or virtual machine monitor (VMM) 1622, on a host 1620 presents the VMs 1624 on the host with a virtual platform and monitors the execution of the VMs 1624. Each VM 1624 may be provided with one or more local IP addresses; the VMM 1622 on a host 1620 may be aware of the local IP addresses of the VMs 1624 on the host. A mapping service 1630 may be aware of (e.g., via stored mapping information 1632) network IP prefixes and IP addresses of routers or other devices serving IP addresses on the local network. This includes the IP addresses of the VMMs 1622 serving multiple VMs 1624. The mapping service 1630 may be centralized, for example on a server system, or alternatively may be distributed among two or more server systems or other devices on the network. A network may, for example, use the mapping service technology and IP tunneling technology to, for example, route data packets between VMs 1624 on different hosts 1620 within the data center 1600 network; note that an interior gateway protocol (IGP) may be used to exchange routing information within such a local network.

In addition, a network such as the provider data center 1600 network (which is sometimes referred to as an autonomous system (AS)) may use the mapping service technology, IP tunneling technology, and routing service technology to route packets from the VMs 1624 to Internet destinations, and from Internet sources to the VMs 1624. Note that an external gateway protocol (EGP) or border gateway protocol (BGP) is typically used for Internet routing between sources and destinations on the Internet. FIG. 16 shows an example provider data center 1600 implementing a network that provides resource virtualization technology and that provides full Internet access via edge router(s) 1614 that connect to Internet transit providers, according to some embodiments. The provider data center 1600 may, for example, provide customers the ability to implement virtual computing systems (VMs 1624) via a hardware virtualization service and the ability to implement virtualized data stores 1616 on storage resources 1618A-1618N via a storage service.

The data center 1600 network may implement IP tunneling technology, mapping service technology, and a routing service technology to route traffic to and from virtualized resources, for example to route packets from the VMs 1624 on hosts 1620 in data center 1600 to Internet destinations, and from Internet sources to the VMs 1624. Internet sources and destinations may, for example, include computing systems 1670 connected to the intermediate network 1640 and computing systems 1652 connected to local networks 1650 that connect to the intermediate network 1640 (e.g., via edge router(s) 1614 that connect the network 1650 to Internet transit providers). The provider data center 1600 network may also route packets between resources in data center 1600, for example from a VM 1624 on a host 1620 in data center 1600 to other VMs 1624 on the same host or on other hosts 1620 in data center 1600.

A service provider that provides data center 1600 may also provide additional data center(s) 1660 that include hardware virtualization technology similar to data center 1600 and that may also be connected to intermediate network 1640. Packets may be forwarded from data center 1600 to other data centers 1660, for example from a VM 1624 on a host 1620 in data center 1600 to another VM on another host in another, similar data center 1660, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1618A-1618N, as virtualized resources to customers of a network provider in a similar manner.

Figure 17:
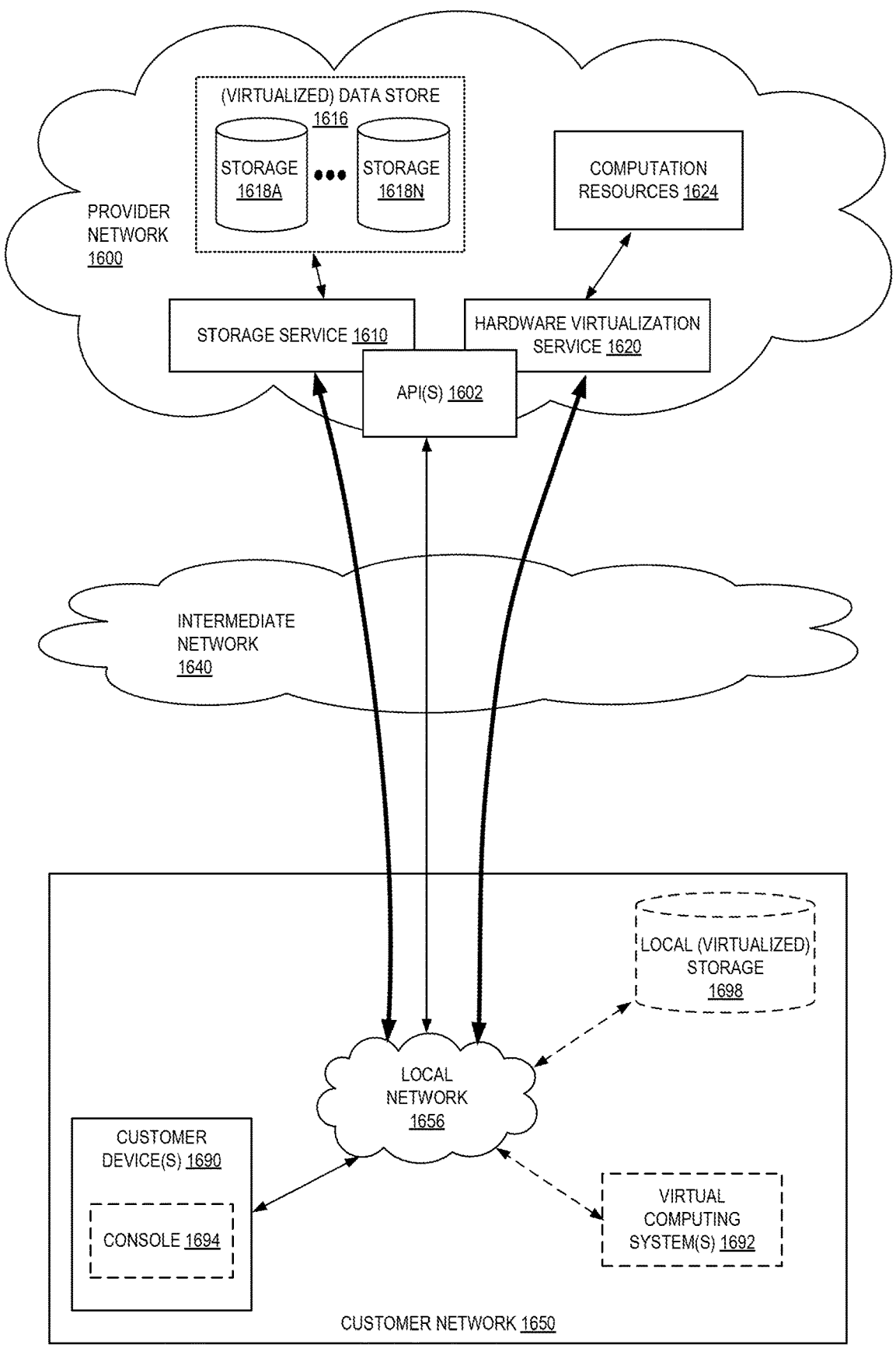
FIG. 17 is a block diagram of an example provider network that provides a storage service and a hardware virtualization service to customers according to some embodiments.

FIG. 17 is a block diagram of an example provider network that provides a storage service and a hardware virtualization service to customers, according to some embodiments. Hardware virtualization service 1720 provides multiple computation resources 1724 (e.g., VMs) to customers. The computation resources 1724 may, for example, be rented or leased to customers of the provider network 1700 (e.g., to a customer that implements customer network 1750). Each computation resource 1724 may be provided with one or more local IP addresses. Provider network 1700 may be configured to route packets from the local IP addresses of the computation resources 1724 to public Internet destinations, and from public Internet sources to the local IP addresses of computation resources 1724.

Provider network 1700 may provide a customer network 1750, for example coupled to intermediate network 1740 via local network 1756, the ability to implement virtual computing systems 1792 via hardware virtualization service 1720 coupled to intermediate network 1740 and to provider network 1700. In some embodiments, hardware virtualization service 1720 may provide one or more APIs 1702, for example a web services interface, via which a customer network 1750 may access functionality provided by the hardware virtualization service 1720, for example via a console 1794 (e.g., a web-based application, standalone application, mobile application, etc.). In some embodiments, at the provider network 1700, each virtual computing system 1792 at customer network 1750 may correspond to a computation resource 1724 that is leased, rented, or otherwise provided to customer network 1750.

From an instance of a virtual computing system 1792 and/or another customer device 1790 (e.g., via console 1794), the customer may access the functionality of storage service 1710, for example via one or more APIs 1702, to access data from and store data to storage resources 1718A-1718N of a virtual data store 1716 (e.g., a folder or "bucket", a virtualized volume, a database, etc.) provided by the provider network 1700. In some embodiments, a virtualized data store gateway (not shown) may be provided at the customer network 1750 that may locally cache at least some data, for example frequently-accessed or critical data, and that may communicate with storage service 1710 via one or more communications channels to upload new or modified data from a local cache so that the primary store of data (virtualized data store 1716) is maintained. In some embodiments, a user, via a virtual computing system 1792 and/or on another customer device 1790, may mount and access virtual data store 1716 volumes via storage service 1710 acting as a storage virtualization service, and these volumes may appear to the user as local (virtualized) storage 1798.

While not shown in FIG. 17, the virtualization service(s) may also be accessed from resource instances within the provider network 1700 via API(s) 1702. For example, a customer, appliance service provider, or other entity may access a virtualization service from within a respective virtual network on the provider network 1700 via an API 1702 to request allocation of one or more resource instances within the virtual network or within another virtual network.

Figure 18:
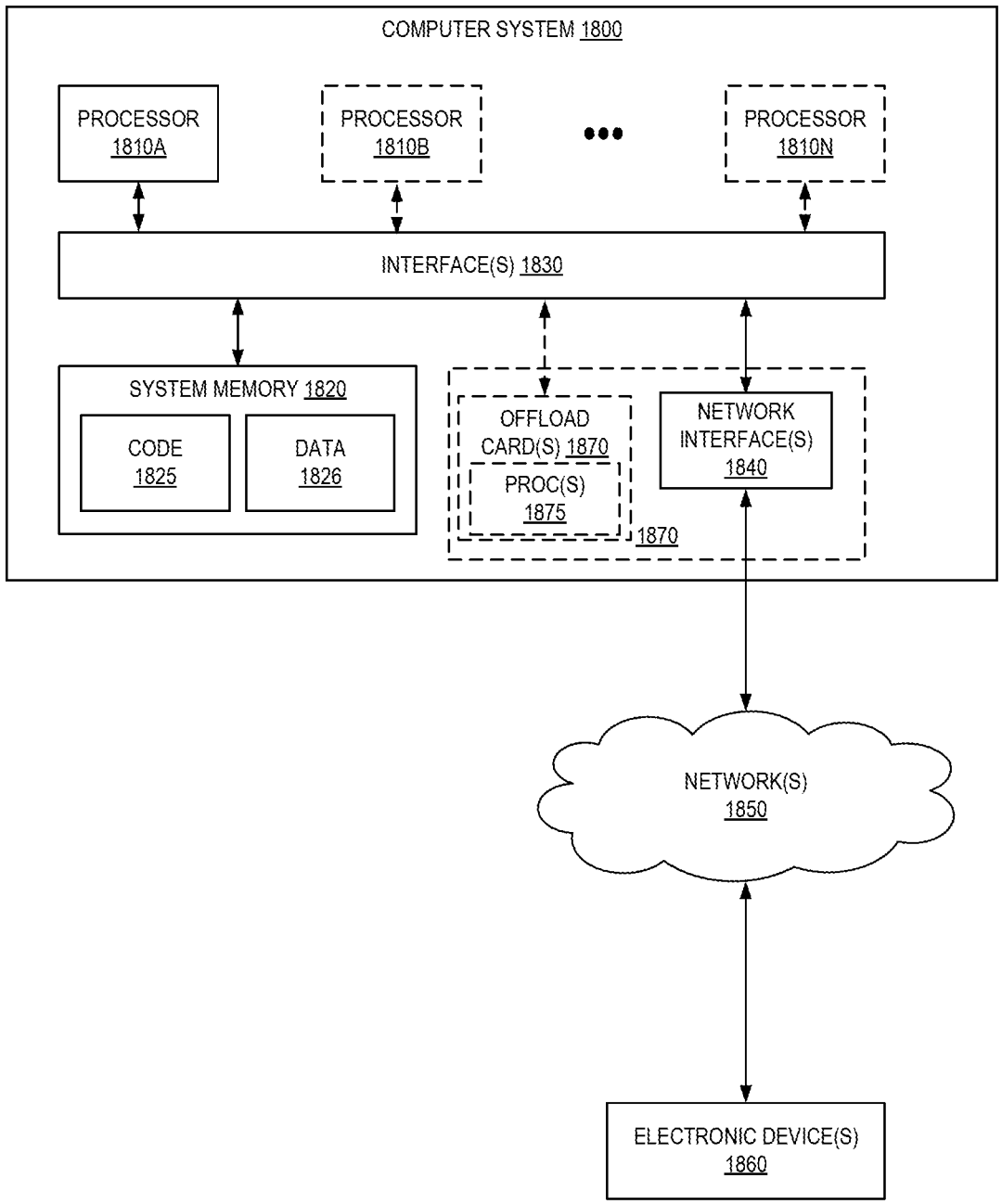
FIG. 18 is a block diagram illustrating an example computer system that may be used in some embodiments.

In some embodiments, a system that implements a portion or all of the techniques as described herein may include a general-purpose computer system that includes or is configured to access one or more computer-accessible media, such as computer system 1800 illustrated in FIG. 18. In the illustrated embodiment, computer system 1800 includes one or more processors 1810 coupled to a system memory 1820 via an input/output (I/O) interface 1830. Computer system 1800 further includes a network interface 1840 coupled to I/O interface 1830. While FIG. 18 shows computer system 1800 as a single computing device, in various embodiments a computer system 1800 may include one computing device or any number of computing devices configured to work together as a single computer system 1800.

In various embodiments, computer system 1800 may be a uniprocessor system including one processor 1810, or a multiprocessor system including several processors 1810 (e.g., two, four, eight, or another suitable number). Processors 1810 may be any suitable processors capable of executing instructions. For example, in various embodiments, processors 1810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1810 may commonly, but not necessarily, implement the same ISA.

System memory 1820 may store instructions and data accessible by processor(s) 1810. In various embodiments, system memory 1820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1820 as code 1825 and data 1826.

In one embodiment, I/O interface 1830 may be configured to coordinate I/O traffic between processor 1810, system memory 1820, and any peripheral devices in the device, including network interface 1840 or other peripheral interfaces. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. Also, in some embodiments some or all of the functionality of I/O interface 1830, such as an interface to system memory 1820, may be incorporated directly into processor 1810.

Network interface 1840 may be configured to allow data to be exchanged between computer system 1800 and other devices 1860 attached to a network or networks 1850, such as other computer systems or devices as illustrated in FIG. 1, for example. In various embodiments, network interface 1840 may support communication via any suitable wired or wireless general data networks, such as types of Ethernet network, for example. Additionally, network interface 1840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1800 includes one or more offload cards 1870 (including one or more processors 1875, and possibly including the one or more network interfaces 1840) that are connected using an I/O interface 1830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1800 may act as a host electronic device (e.g., operating as part of a hardware virtualization service) that hosts compute instances, and the one or more offload cards 1870 execute a virtualization manager that can manage compute instances that execute on the host electronic device. As an example, in some embodiments the offload card(s) 1870 can perform compute instance management operations such as pausing and/or un-pausing compute instances, launching and/or terminating compute instances, performing memory transfer/copying operations, etc. These management operations may, in some embodiments, be performed by the offload card(s) 1870 in coordination with a hypervisor (e.g., upon a request from a hypervisor) that is executed by the other processors 1810A-1810N of the computer system 1800. However, in some embodiments the virtualization manager implemented by the offload card(s) 1870 can accommodate requests from other entities (e.g., from compute instances themselves), and may not coordinate with (or service) any separate hypervisor.

In some embodiments, system memory 1820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1800 via I/O interface 1830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1800 as system memory 1820 or another type of memory. Further, a computer-accessible medium may include transmission media or signals such as electrical, electromagnetic, or digital signals, conveyed via a communication medium such as a network and/or a wireless link, such as may be implemented via network interface 1840.

Figure 19:
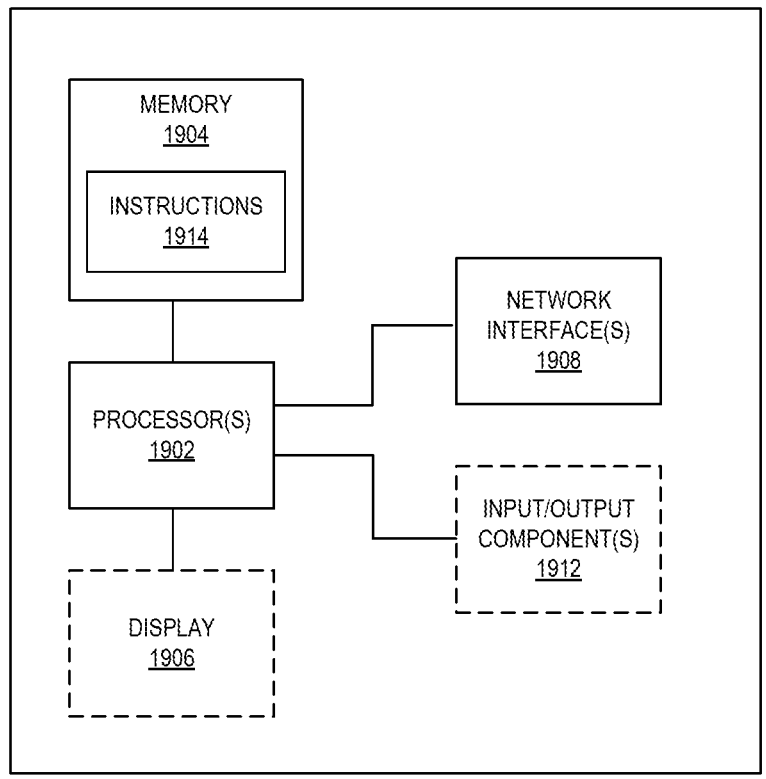
FIG. 19 illustrates a logical arrangement of a set of general components of an exemplary computing device that can be utilized in accordance with various embodiments.

FIG. 19 illustrates a logical arrangement of a set of general components of an example computing device 1900 such as those detailed above. Generally, a computing device 1900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1904) to store code (e.g., instructions 1914) and/or data, and a set of one or more wired or wireless network interfaces 1908 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1904) of a given electronic device typically stores code (e.g., instructions 1914) for execution on the set of one or more processors 1902 of that electronic device. One or more parts of various embodiments may be implemented using different combinations of software, firmware, and/or hardware.

A computing device 1900 can include some type of display element 1906, such as a touch screen or liquid crystal display (LCD), although many devices such as portable media players might convey information via other means, such as through audio speakers, and other types of devices such as server end stations may not have a display element 1906 at all. As discussed, some computing devices used in some embodiments include at least one input and/or output component(s) 1912 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 20:
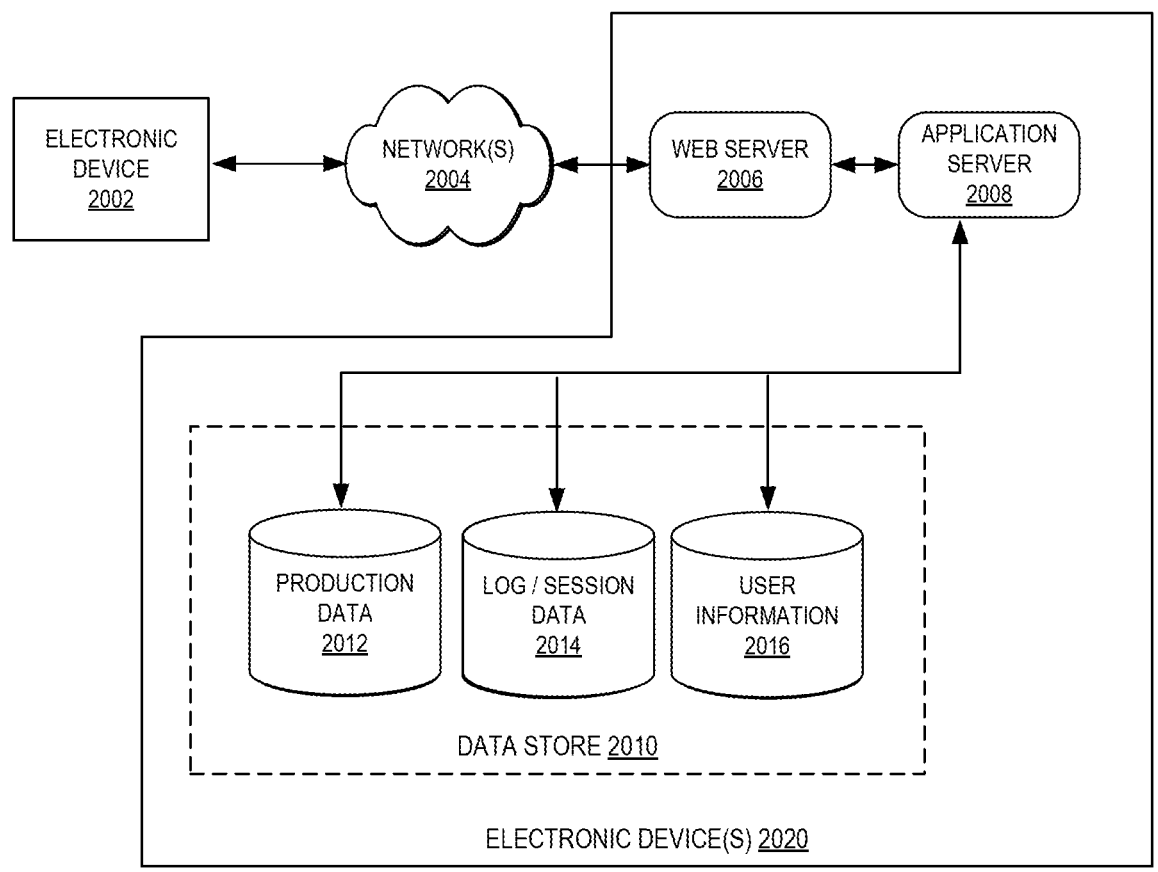
FIG. 20 illustrates an example of an environment for implementing aspects in accordance with various embodiments.

As discussed, different approaches can be implemented in various environments in accordance with the described embodiments. For example, FIG. 20 illustrates an example of an environment 2000 for implementing aspects in accordance with various embodiments. For example, in some embodiments requests are HyperText Transfer Protocol (HTTP) requests that are received by a web server (e.g., web server 2006), and the users, via electronic devices, may interact with the provider network via a web portal provided via the web server 2006 and application server 2008. As will be appreciated, although a web-based environment is used for purposes of explanation, different environments may be used, as appropriate, to implement various embodiments. The system includes an electronic client device 2002, which may also be referred to as a client device and can be any appropriate device operable to send and receive requests, messages or information over an appropriate network 2004 and convey information back to a user of the device 2002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 2004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 2004 includes the Internet, as the environment includes a web server 2006 for receiving requests and serving content in response thereto, although for other networks an alternative device serving a similar purpose could be used, as would be apparent to one of ordinary skill in the art.

The illustrative environment includes at least one application server 2008 and a data store 2010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 2008 can include any appropriate hardware and software for integrating with the data store 2010 as needed to execute aspects of one or more applications for the client device 2002 and handling a majority of the data access and business logic for an application. The application server 2008 provides access control services in cooperation with the data store 2010 and is able to generate content such as text, graphics, audio, video, etc., to be transferred to the client device 2002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 2002 and the application server 2008, can be handled by the web server 2006. It should be understood that the web server 2006 and application server 2008 are not required and are merely example components, as structured code discussed herein can be executed on any appropriate device or host machine as discussed elsewhere herein.

The data store 2010 can include several separate data tables, databases, or other data storage mechanisms and media for storing data relating to a particular aspect. For example, the data store illustrated includes mechanisms for storing production data 2012 and user information 2016, which can be used to serve content for the production side. The data store 2010 also is shown to include a mechanism for storing log or session data 2014. It should be understood that there can be many other aspects that may need to be stored in the data store, such as page image information and access rights information, which can be stored in any of the above listed mechanisms as appropriate or in additional mechanisms in the data store 2010. The data store 2010 is operable, through logic associated therewith, to receive instructions from the application server 2008 and obtain, update, or otherwise process data in response thereto. In one example, a user might submit a search request for a certain type of item. In this case, the data store 2010 might access the user information 2016 to verify the identity of the user and can access a production data 2012 to obtain information about items of that type. The information can then be returned to the user, such as in a listing of results on a web page that the user is able to view via a browser on the user device 2002. Information for a particular item of interest can be viewed in a dedicated page or window of the browser.

The web server 2006, application server 2008, and/or data store 2010 may be implemented by one or more electronic devices 2020, which can also be referred to as electronic server devices or server end stations, and may or may not be located in different geographic locations. Each of the one or more electronic devices 2020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 20. Thus, the depiction of the environment 2000 in FIG. 20 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to perform named-entity recognition on a document;
   extracting character features for each word of a set of words of the document using a character-level encoder;
   extracting word-level representations for the set of words using a word-level encoder based at least in part on the extracted character features, wherein the word level representations each being a concatenation of a case sensitive word embedding lookup for the word in the set of words, a case insensitive word embedding lookup for the word in the set of words, and a case sensitive word embedding lookup for the word in the set of words in which a first character of the word is capitalized, each lookup being performed by the word-level encoder;
classifying the word level representations according to a tag decoder; and
outputting the classifications as named-entity labels.

2. The computer-implemented method of claim 1, wherein the character-level encoder is a convolutional neural network (CNN) model, the word-level encoder comprises at least one CNN model, and the tag decoder is a long short term memory (LSTM) model.

3. The computer-implemented method of claim 2, wherein the word-level encoder comprises multiple CNN models, and wherein the CNN models of the word-level encoder include separate embedding models for case sensitive and case insensitive lookups.

4. The computer-implemented method of claim 3, wherein the case sensitive embedding model is to return a vector of zeros upon no match being found and is to return the word being looked up upon a match.

5. The computer-implemented method of claim 3, wherein the case insensitive embedding model is to return a vector of zeros upon no match being found and is to return a lower case version of the word being looked up upon a match.

6. The computer-implemented method of claim 3, wherein the case sensitive embedding model is to return a vector of zeros upon no match being found for a case sensitive word embedding lookup for only a first character of a word and is to return the word being looked up upon a match.

7. The computer-implemented method of claim 1, wherein the character encoder, word encoder, and tag decoder have been jointly trained using an augmented dataset that includes upper case and lower case representations of objects of the dataset prior to augmentation.

8. The computer-implemented method of claim 1, wherein at least the tag decoder has been trained using an augmented dataset that includes upper case and lower case representations of objects of the dataset prior to augmentation.

9. The computer-implemented method of claim 1, wherein when a word is a named entity, but is not correctly capitalized, a case-sensitive lookup fails, but a case-insensitive lookup and a case-sensitive lookup with the first character upper-cased returns a non-failing result.

10. The computer-implemented method of claim 1, wherein when a word is a named entity, and it is correctly capitalized, all lookups of the word-level encoder return a non-failing result.

11. The computer-implemented method of claim 1, wherein when a word was not correctly spelled, all lookups of the word-level encoder return a failing result.

12. The computer-implemented method of claim 1, wherein a word can both be a named-entity and not a named-entity, all lookups of the word-level encoder return a non-failing result.

13. The computer-implemented method of claim 1, wherein the character-level encoder is a long short term memory (LSTM) model, the word-level encoder comprises at least one LSTM model, and the tag decoder is a LSTM model.

14. A system comprising:
a storage device to store a document; and
one or more electronic devices to implement a named-entity recognition service, the named-entity recognition service including instructions that upon execution cause the named-entity recognition service to:
receive a request to perform named-entity recognition on the document;
extract character features for each word of a set of words of the document using a character-level encoder;
extract word level representations for the set of words using a word-level encoder based at least in part on providing the extracted character features as an input to the word-level encoder, wherein the word level representations each being a concatenation of a case sensitive word embedding lookup for the word in the set of words, a case insensitive word embedding lookup for the word in the set of words, and a case sensitive word embedding lookup for the word in the set of words in which a first character of the word is capitalized;
classify the word level representations according to a tag decoder; and
output the classifications as named-entity labels.

15. The system of claim 14, wherein the character-level encoder is a convolutional neural network (CNN) model, the word-level encoder comprises at least one CNN model, and the tag decoder is a long short term memory (LSTM) model.

16. The system of claim 15, wherein the word-level encoder comprises multiple CNN models, and wherein the CNN models of the word-level encoder include separate embedding models for case sensitive and case insensitive lookups.

17. The system of claim 14, wherein the character-level encoder is a long short term memory (LSTM) model, the word-level encoder comprises at least one LSTM model, and the tag decoder is a LSTM model.

18. A non-transitory computer-readable media storing instructions which, when executed by one or more electronic devices that implement a named entity recognition service, cause the named entity service to:
receive a request to perform named-entity recognition on a document;
extract character features for each word of a set of words of the document using a character-level encoder;
extract word level representations for the set of words using a word-level encoder based at least in part on providing the extracted character features as an input to the word-level encoder, wherein the word level representations each being a concatenation of a case sensitive word embedding lookup for the word in the set of words, a case insensitive word embedding lookup for the word in the set of words, and a case sensitive word embedding lookup for the word in the set of words in which a first character of the word is capitalized;
classify the word level representations according to a tag decoder; and
output the classifications as named-entity labels.

19. The non-transitory computer-readable media of claim 18, wherein the character-level encoder is a convolutional neural network (CNN) model, the word-level encoder comprises at least one CNN model, and the tag decoder is a long short term memory (LSTM) model.

20. The non-transitory computer-readable media of claim 19, wherein the word-level encoder comprises multiple CNN models, and wherein the CNN models of the word-level encoder include separate embedding models for case sensitive and case insensitive lookups.

* * * * *